US010918018B2

(12) United States Patent
Kohl et al.

(10) Patent No.: US 10,918,018 B2
(45) Date of Patent: Feb. 16, 2021

(54) FRUIT COLLECTOR, RETAINING BRACKET AND COLLECTING CONTAINER

(71) Applicant: HUSQVARNA AB, Huskvarna (SE)

(72) Inventors: Peter Kohl, Illertissen (DE); Bruno Häussler, Illerkirchberg (DE); Karin Schaffer, Senden (DE); Gerhard Streitferdt, Neu-Ulm (DE); Siegfried Rau, Hattenhofen (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/500,158

(22) PCT Filed: Mar. 26, 2015

(86) PCT No.: PCT/EP2015/056623
§ 371 (c)(1),
(2) Date: Jan. 30, 2017

(87) PCT Pub. No.: WO2016/020075
PCT Pub. Date: Feb. 11, 2016

(65) Prior Publication Data
US 2017/0265393 A1    Sep. 21, 2017

(30) Foreign Application Priority Data

Aug. 2, 2014 (DE) .................. 20 2014 006 295.1
Oct. 23, 2014 (DE) .................. 10 2014 115 425.8

(51) Int. Cl.
*A01D 51/00* (2006.01)
*A63B 47/02* (2006.01)

(52) U.S. Cl.
CPC .......... *A01D 51/002* (2013.01); *A63B 47/021* (2013.01)

(58) Field of Classification Search
USPC ........................................ 294/19.2
See application file for complete search history.

(56) References Cited

U.S. PATENT DOCUMENTS

| 638,912 A | 12/1899 | Cross |
| 1,034,989 A | 8/1912 | Eccleston |
| 1,632,597 A * | 6/1927 | Hall ....................... A01D 46/00 56/330 |

(Continued)

FOREIGN PATENT DOCUMENTS

| CN | 201216071 Y | 4/2009 |
| CN | 201967352 U | 9/2011 |

(Continued)

OTHER PUBLICATIONS

International Search Report and Written Opinion for International Application No. PCT/EP2015/056623 dated Jul. 3, 2015.

(Continued)

*Primary Examiner* — Alicia Torres
(74) *Attorney, Agent, or Firm* — Burr & Forman, LLP

(57) ABSTRACT

A fruit collector (1) may include a retaining bracket (3) and a collecting container (4) that is pivotably associated with the retaining bracket. The retaining bracket includes a hub (9) arranged to pivotably retain a stub axle section (12) of the collecting container projecting from an axial end of the collecting container.

16 Claims, 10 Drawing Sheets

(56) References Cited

U.S. PATENT DOCUMENTS

| | | | | |
|---|---|---|---|---|
| 1,644,366 | A | * | 10/1927 | Brown ................. A01D 51/002 |
| | | | | 123/179.16 |
| 3,068,634 | A | | 12/1962 | Robinson |
| 3,215,293 | A | | 11/1965 | Kelly et al. |
| 3,227,298 | A | * | 1/1966 | Shoemaker .......... A63B 47/021 |
| | | | | 294/19.2 |
| 3,348,652 | A | * | 10/1967 | Vinyard .................... A01K 1/01 |
| | | | | 198/513 |
| 3,604,190 | A | | 9/1971 | Wray |
| 3,675,406 | A | * | 7/1972 | Grant ..................... A01D 46/28 |
| | | | | 56/330 |
| D323,831 | S | * | 2/1992 | Hollis ............................ D15/10 |
| 5,407,242 | A | * | 4/1995 | Beranek ............... A63B 47/021 |
| | | | | 294/19.2 |
| 6,460,249 | B1 | | 10/2002 | Holt, Jr. |
| 8,132,836 | B2 | * | 3/2012 | Chen ....................... A63B 47/02 |
| | | | | 294/19.2 |
| 2001/0048228 | A1 | * | 12/2001 | Carr ........................ A63B 47/02 |
| | | | | 294/19.2 |
| 2012/0279194 | A1 | | 11/2012 | Pope |

FOREIGN PATENT DOCUMENTS

| | | |
|---|---|---|
| CN | 102577756 A | 7/2012 |
| CN | 203072387 U | 7/2013 |
| DE | 202011101544 U1 | 10/2011 |
| JP | H10290616 A | 11/1998 |
| KR | 20130058982 A | 6/2013 |
| KR | 20130117217 A | 10/2013 |
| WO | 2013064660 A1 | 5/2013 |

OTHER PUBLICATIONS

International Preliminary Report on Patentability for International Application No. PCT/EP2015/056623 dated Jul. 8, 2016.
Foshan Shunde Yongchang Metal Products Co., Ltd., "Circular Metal Fruit Basket".
"Pickup Wizard For Large Fruits and Nuts (1.25-inch diameter minimum)", accessed at http://www.gardenersedge.com/pickup-wizard-for-large-fruits-and-nuts-125-inch-diameter-minimum/p/NWW/, accessed on Nov. 17, 2016, pp. 2.
"Roll-in, multi use collector", accessed at https://www.roll-in.eu/, accessed on Nov. 17, 2016, p. 1.

* cited by examiner

FRUIT COLLECTOR, RETAINING BRACKET AND COLLECTING CONTAINER

The present application is directed to a fruit collector, a retaining bracket, and a collecting container of and for such a fruit collector.

Collecting fruit, such as apples, pears, quinces and the like, from the ground is comparatively cumbersome if done manually.

Therefore, efforts have been made to at least partially ease picking up fruits from the ground. Reference is exemplarily made to WO 2013/064660 A1 which shows a fruit collector having a collecting basket made from a plurality of elastic wires. By moving the container over a fruit lying on the ground, the wires where the fruit touches the basket are spread apart such that the fruit can enter the container through the basket wall made from the wires.

Known devices for collecting fruits indeed may ease picking up fruits, but still leave room for improvement, in particular with respect to construction, assembly, and still further simplifying picking up of fruits.

Therefore, it is an object of the invention to provide a fruit collector, a retaining bracket, and a collecting container for a fruit collector that are able to ease construction and assembly, and further may be suitable for further improvements in view of fruit collection and fruit collection efficiency.

This object in particular is accomplished with the features and subject matter of the independent claims. Embodiments in particular also result from respective dependent claims.

According to an aspect of the invention, a retaining bracket, in particular a retaining frame or retaining structure is provided that is implemented to be used with a fruit collector. In particular, a retaining bracket or frame shall be provided that is able to pivotably retain or support a fruit collecting container or fruit collecting basket of a fruit collector.

According to a further aspect of the invention, a fruit collecting container is provided, that may be used in connection with a retaining bracket. Embodiments of the fruit collecting container are given below.

According to a further aspect of the invention a fruit collector is provided, comprising a fruit collecting tool having a pivotable fruit collecting container, in particular according to any embodiment described herein, and an adapter unit arranged to be releasably coupled to a counterpart adapter unit, and/or the fruit collector comprising a collecting container in particular in accordance with any embodiment described herein, and a retaining bracket in particular in accordance with any embodiment described herein.

In embodiments, an adapter unit arranged to be releasably coupled to a counterpart adapter unit may be associated, in particular fixedly or releasably mounted, to the retaining bracket. The counterpart adapter unit may for example be associated with a handle, such that the fruit collecting tool can be releasably coupled to the handle for manual operation.

According to a further aspect of the invention, that can be claimed separately, a fruit collector device, that in particular may be embodied as a manual fruit collector or as a retaining bracket for a fruit collector as such, is provided, wherein the fruit collector device is arranged to pivotably support a fruit collecting container and comprising an axial spout arranged to pass through fruits, in particular to pass through fruits intended to be collected into and/or out of the fruit collecting container when it is coupled, in particular pivotably coupled, to the fruit collector or retaining bracket. The retaining bracket, collecting container, hub, and/or further or additional features of the spout may be embodied in accordance with any embodiment described herein.

According to a further aspect of the invention, a hub for a fruit collector shall be provided, which hub is arranged to be coupled to a fruit collector or a retaining bracket of a fruit collector, and which hub is configured such that a collecting container for collecting or picking up fruits, in particular in a rolling operational movement, can be pivotably coupled to it. The retaining bracket, collecting container, spout and/or further or additional features of the hub may be embodied in accordance with any embodiment described herein.

A fruit collector or fruit collector device according to a further aspect of the invention may be configured to be manually operated. However, it may in embodiments also be possible to implement the fruit collector in an automatic or semi-automatic fruit collecting machine.

The fruit collector may be configured and operated to collect fruits lying on the ground by moving, in particular rolling, the collecting container by means of a retaining bracket pivotably retaining the collecting container over fruits lying on the ground.

The fruits moved or rolled over may pass through a permeable wall, in particular envelope, of the collecting container. The permeable wall may in embodiments for example be implemented as an elastic wire mesh or wire bar structure adapted to pass through fruits upon elastic deformation of the wire mesh or wire bar structure.

The fruit collector, retaining bracket, hub, spout and/or collecting container may either be specifically adapted to a special fruit/object or may be configured to be used with and/or customized to a certain number of fruits or objects of similar shape. For example, the retaining bracket may be configured such that it can accommodate different types of collecting containers respectively adapted to collect a specific type of fruit, e.g. apples, peaches, nuts, and so on. In particular, the retaining bracket may be adapted for multiple uses with different types or sizes of collecting containers.

According to a further aspect of the invention, a fruit collector system or kit may be provided that comprises at least one retaining bracket and at least one collecting container, wherein the kit may be adapted such that different types, sizes or shapes of collecting containers, in particular specifically adapted to collect different types, sizes or shapes of fruits can be used. Such a kit in particular may comprise a number of fruit collecting tools having pivotable collecting containers that can be coupled with a respective handle. Each fruit collecting tool may comprise a separate retaining bracket associated with a corresponding collecting container according to any embodiment described herein. However, it is also possible that the collecting tools comprise a uniform retaining bracket and a certain number of collecting containers in which each of the collecting containers is configured to be coupled to the uniform retaining bracket.

The uniform retaining bracket may be fixed in shape and adapted to be coupled to a single collecting container or to a certain number of different collecting containers. In particular, different types of collecting containers may be configured to be coupled with the uniform retaining bracket. Alternatively, the retaining bracket may be implemented to be variable in shape and/or form, such that it can be adapted to different shapes and/or forms of collecting containers. However, also in the embodiment with variable retaining bracket, a certain setting of the retaining bracket in form or shape may be provided that is able to cooperate with several types of collecting containers adapted to said certain setting.

In such a system or kit the fruit collector can easily be adapted to the collection of different kinds of fruits or objects, for example by exchanging the type of fruit collecting tool and/or just the collecting container. The retaining bracket, collecting container, hub, and/or spout of such a system or kit may be embodied in accordance with any embodiment described herein.

The retaining bracket in embodiments may be implemented to pivotably support or retain the collecting container in such a way that the collecting container is pivotable around a major axis of rotation. The axis of rotation, or pivot axis in particular may coincide with an axis of symmetry, in particular an axis of rotational symmetry, of the collecting container.

The collecting container may comprise an oblong or prolong structure, i.e. it may have a structure in which a dimension in axial direction, in particular parallel to or coinciding with the pivot axis, is larger than a dimension in transverse, radial direction, or it may have a structure in which the dimension in axial direction is smaller than the dimension in transversal, in particular radial, direction.

The retaining bracket in embodiments comprises a hub that is arranged to pivotably retain a stub axle section of a collecting container.

The hub in further embodiments may be implemented as an annular hub, or ring hub, or ring segment hub. The annular or ring hub or ring segment hub may in embodiments comprise an annular or ring-shaped or ring-segment shaped bearing surface, which in particular may be a sliding surface. The bearing, in particular sliding surface may, with respect to a pivot axis defined by the hub, be implemented as radial surface extending over circumferential section of the hub. An opening or dihedral angle of the radial surface relative to the pivotal axis may lie in the range from 360 degrees to about 180 degrees. In a 360 degree implementation, the bearing or sliding surface may be configured to encircle in circumferential direction relative to the pivot axis a corresponding bearing or sliding surface of the collecting container.

In embodiments, the hub may be implemented as an integral hub of the retaining bracket, i.e. the hub may be implemented as an integral part of the retaining bracket. In particular, the hub may be implemented in a one-piece configuration with the bracket.

In other embodiments, the hub may be implemented as a non-integral component. In particular in such embodiments, the retaining bracket and hub may comprise corresponding fixing or mounting interfaces such that the hub and retaining bracket can be fixed to each other, in particular detachably fixed to each other, by at form-fit connection, a bonded connection, and/or a clamp-locking or frictional-locking connection.

In embodiments, the bracket and hub may be implemented in a one-piece configuration. In particular in this case, but also in any other embodiments, the bracket and hub may be manufactured from a polymeric material, reinforced polymeric material, from metal, in particular light metals or metal alloys, or polymeric-metal composites.

In embodiments and variants of the bracket and/or hub, external as well as internal reinforcement elements or means, such as fibres, ribs, fins, grids and the like may be used or provided.

The design of the bracket and hub, in particular in integral form, may contribute to simplified manufacture, enhanced mechanical strength, and may as well provide a broader range for technical design options.

In embodiments, the hub may be arranged to pivotably retain a stub axle section of the collecting container, which stub axle section is projecting from an axial end of the collecting container. As already mentioned, the hub may be a ring hub or annular hub, or implemented as a sectional ring hub.

In embodiments, the hub, in particular when implemented as a ring or annular hub, may comprise an inner bearing shell, bearing surface, and/or sliding surface configured to interact with an outer counter bearing shell, counter bearing surface or outer counter sliding surface of the stub axle section. In particular in case that the hub is implemented as a sectional ring hub, the hub, bearing and/or sliding surface or shell may only partially surround respective counter surfaces or shells. In case that the hub is implemented as a circumferential hub or ring hub, the surfaces or shells of the hub for establishing bearing or sliding contact with the counter surfaces or shells of the collecting container may encircle or completely surround the counter surfaces or shells.

In particular, bearing shells or surfaces or sliding surfaces of the hub and stub axle section cooperating with each other in the mounted state may comprise annular shaped, radial surfaces facing and/or abutting each other when assembled.

The hub and/or stub axle section in embodiments may be provided with axial surfaces, in particular axial stop surfaces or flanges configured to define or restrict the relative axial position and/or axial movement of the hub and stub axle section. Respective axial surfaces may act or define axial bearing or sliding surfaces, in particular configured to support pivotal movement of the collecting container when rolled on the ground.

It is a finding related to the underlying invention that a design in which the bracket comprises a hub, in particular an integrated hub, and the collecting container comprises a stub axle section that may be pivotably retained by the hub may be advantageous with respect to manufacture, stability, handling, maintenance, and also may contribute to implement a broader range of additional and advantageous functionalities and operational technical designs allowing simplified and/or more efficient collection of fruits. In particular the proposed hub and stub axle section make it possible to pivotably couple the retaining bracket and collecting container via comparatively large surfaces, in particular bearing or sliding surfaces having enlarged 2-dimensinal surface areas. This in particular may be an advantage as compared to point support bearing in view of stability and operability. Advantages as mentioned beforehand in particular may be obtained by embodiments of the invention described herein.

In embodiments, the hub may comprise an inner, central hole, passage, or aperture. The central hole of the hub may be configured and sized to enable fruits of the type intended to be collected passing through. In other words, the central hole may be designed to enable fruits of the type the fruit collecting container is designed and intended for, e.g. apples and the like, passing through.

In embodiments, the cross section of the inner hole and/or the dimensions of the spout may be such that, in particular with respect to average or ordinary mean sizes of the type of fruit to be collected, only one fruit at a time can pass the inner hole and/or spout. Such a configuration in particular has turned out to be most efficient, for example for apples, or peaches or pears, for removing the fruits contained in the collecting container from the collecting container. In addition, in such a way it has been found out by the inventors, that damages to the skin of the fruits when dumped or poured out of the collecting container via the inner hole can be kept at a minimum.

It shall be mentioned, that the dimension and size of the fruit collector and parts thereof may have general and medium values valid for a variety of fruits. However, it is also possible, that at least certain dimensions, sizes or parameters are adapted to the collection of a specific type of fruit, e.g. apples, pears, quinces, and the like. Respective dimensions in particular may relate to the size and inner diameter of the spout and inner hole, to the size and volume of the collecting container, to the dimensions and mechanical strength of the retaining bracket, hub, spout and/or stub axle section, and the like.

The central hole in embodiments may be adapted and arranged to communicate via a container opening of the collecting container at the stub axle section with the inner volume of the collecting container once the collecting container is coupled, in particular pivotably coupled, to the hub.

In particular, a collecting container that may be pivotably coupled via or at a stub axle section to the retaining bracket, or hub may comprise at the stub axle section a through-hole, aperture, or opening which in the mounted state communicates and/or is aligned with the central hole of the hub. In the coupled state, fruits may then be passed through the central hole and through-hole, and as the case may be through the spout, into and out of the collecting container.

The through-hole in the stub axle section may be implemented by using or providing the stub axle section in a hollow shaft or ring shaft type configuration. In particular, the through-hole may be concentric to a pivotal axis defined by the stub axle section.

In embodiments, the through-hole of the stub axle section may be adapted in size to match or fit the central hole in the hub. The size of the through-hole of the stub axle section and central hole of the hub may be such that they form, in the ordinary mounted configuration in which the collecting container is pivotably retained by the retaining bracket, a through-opening or channel leading from the outside of the collecting container through the hub and stub axle section to the inside of the collecting container.

The through-opening or channel defined by the central hole of the hub and through-hole of the stub axle section preferably is dimensioned and sized such that fruits for which the fruit collector and respective parts are designed for can pass therethrough. Preferably, the through-opening or channel is dimensioned such that only one fruit at a time can pass with respect to the fruit intended to be collected, or with respect to such fruits for which the fruit collector is specifically adapted to.

In embodiments, that may be claimed as well, the retaining bracket may be configured such that different types of collecting containers can be pivotably attached. For example, if two different types of fruit require different handling or provide different collecting prerequisites, such as for example different size and/or shape and/or different hardness of the fruit skin, a fruit collecting container specifically fitting and complying with specific requirements may be mounted to the retaining bracket. In case that a different type of fruit having different requirements shall be collected, a corresponding fruit collecting container may be coupled to the retaining bracket, whilst a non-fitting one may be removed. In particular, a multi-functional fruit collector can be provided.

In order to obtain adequate inner diameters of the channel or through-opening, the through-hole of different types of collecting containers may be adapted to the fruit it is intended for. In this way, the effective passage diameter of the channel may be defined and adjusted by the inner diameter of the through-hole. However, it is also possible to provide washers, adapter sleeves and/or reducing bushes adapted to be inserted into the channel or through-opening to adapt the inner diameter thereof.

An exchange of the fruit collector may for example be accomplished by axially compressing the collecting container and setting the compressed collecting container into the retaining bracket. After releasing the compressed collecting container in axial direction, it may elastically extend to thereby couple in a pivotable manner to the retaining bracket.

In further embodiments the retaining bracket may comprise a spout that is configured to pass through fruits or objects to be collected. The spout in particular may be configured to pass through fruits into and out of the collecting container. Preferably, the spout extends and opens in a direction parallel and/or inclined to a pivoting axis the hub.

In embodiments, the retaining bracket may comprise at or on an outer side a spout aligned and communicating with the central hole of the hub.

The spout may comprise at least one straight section, in particular of tube-shaped configuration, and/or may comprise at least one bent section, in particular of elbow-shaped configuration.

The spout may be dimensioned and sized such that fruits intended to be collected, i.e. fruits for which a fruit collector comprising the retaining bracket is designed for, can be passed through the spout and further through the central hole of the hub and, in case that a collecting container is coupled to the retaining bracket, also through-hole of the stub axle section. Thereby a respective fruit may be accommodated in or passed into, or the fruit may be removed from the collecting container in an axial direction and/or inclined to the axial direction of the collecting container, wherein the axial direction is parallel, preferably coincides, with the pivotal axis defined by the retaining bracket.

In embodiments, the spout may be integrally formed with the retaining bracket and hub. This in particular shall mean that the spout and hub form and define a single-part component. In such embodiments, the spout may in particular be fixedly and immovably attached to or implemented at the retaining bracket.

In other embodiments, the spout may be provided as a separate component and may be configured to be mounted or connected to the hub and retaining bracket. In particular in such embodiments, the spout may be movably attached to the retaining bracket and/or hub. In particular the spout, or at least a section thereof, may be attached or mounted such that it can be swivelled and/or rotated relative to a central axis of the central hole of the hub.

The spout may be implemented such that the direction and orientation of an open end of the spout facing away from the hub and defining a type of collection mouth or emptying opening can be altered in a rotating and/or swivelling movement of the spout or the moveable section thereof. In this way, the spout can be adjusted to best suit fruit collecting requirements and user-specific operating conditions.

In embodiments, the spout and/or an outer edge of the spout may be specifically adapted and/or shaped, in particular at least one of corrugated, recessed, and toothed, and/or dimensioned, and/or the spout and/or its outer edge or rim may be adjustable in its shape so as to support picking-up of fruits via the spout, and/or to impede dropping-out of fruits from the collecting container, in particular in operational modes or conditions where the fruit collection container is rolled over the ground in order to pick up fruits.

In specific embodiments, the spout may comprise at or on its outer edge or rim one or more recesses, preferably of open-edge design. The recesses may for example extend along the rim, in particular in circumferential direction thereof, and in a direction parallel to the normal vector of the spout opening. In particular, the recess/es may be implemented as cutouts in the form of a segment of a circle at the edge of the spout. In general, the resecc/es may comprise rounded troughs and/or rounded outer borders or corners so as to avoid or at least to reduce the danger of injuring the skin or surface of an object collected via the spout.

In case that the spout has several recesses, such as for example a pair of recesses, they may be positioned and provided on opposing faces of the edge or rim of the spout. The recesses may, for example, with respect to a normal center axis or a center plane of the spout opening be provided in a symmetric and/or evenly distributed manner.

The structure or contour provided on the outer edge or rim of the spout, in particular spout opening, may for example provide support or aid in operational modes, in which objects, such as fruits, are or have to be collected via the spout. A collection via the spout may for example be necessary in case that that the object is located in a position that is not accessible in the rolling-over operational mode in which the objects are collected by rolling the fruit collector over the object in a rotational rolling movement.

In embodiments, the spout may be shaped and dimensioned such that fruit collecting events or actions can take place via the spout, central opening of the hub and throughhole of the stub axle section. That is, a fruit collector comprising a respective retaining bracket with spout may be used in an operational mode allowing fruit picking through and by the spout. Such operational modes may be adequate for picking-up comparatively large fruits, or fruits that are inaccessible in a rolling over collecting action, in particular fruits that are still hanging on the tree.

In embodiments, the spout or at least a section thereof may have a bowl-shaped, paddle-shaped and/or shovel-shaped configuration. The spout may be dimensioned such that it enables active fruit collecting or picking via the spout. The shapes as proposed beforehand may facilitate picking-up fruits by using the spout. Further, these shapes may be useful for preventing fruit items from falling off or slipping out of the collecting container once they have been picked. Further, the proposed shapes may support and ease transfer of a picked fruit from the spout into the collecting container.

In embodiments, the spout may have further auxiliary elements or specific technical designs configured and adapted to support the collecting of fruits. In particular a circumference of the spout opening may have a toothed shape which may be beneficial for picking fruits from a tree.

In embodiments, the spout may extend from the hub or bracket in accordance with a shape like a pipe bend or pipe elbow or pipe turn. The spout may have a collection mouth, emptying opening, or spout opening, in particular an opening facing away from the hub or bracket, that is inclined relative to the pivot axis defined by the hub, in particular such that the opening faces upwards in the collecting operational mode of the bracket or hub. An angle of inclination in counter-clockwise sense between the pivot axis and the opening plane may be in the range between 25 and 60 degrees, or in the range between 30 and 40 degrees, or in the range of about 35 degrees. It has been identified that the angle of the opening relative to the horizontal, in particular to the pivot axis, or also relative to the vertical, may be of relevance for obtaining good collecting properties and/or discharging properties of the spout while at the same time being able to prevent fruits from slipping out of the collecting container in ordinary rolling operational mode.

In embodiments, the spout may be configured such that a centre of curvature, relative to the ordinary rolling operational mode in a vertical cross section in running through the pivot axis lies in, at, or axially outside a plane defined by the hub, in particular the central hole of the hub, or a plane through the transitional area between the spout and hub.

In refined embodiments, a centre of curvature is located at or axially outside, in particular slightly axially outside of the retaining bracket or hub. Such centres of curvature have been identified to be of particular advantage for both picking up fruits from the ground and preventing fruits from slipping out of the collecting container over an outer rim of the spout in the ordinary operational mode.

In embodiments, the opening plane of the opening of the spout may be implemented in such a way, that in an optimal or average operational condition of the fruit collector related to a rolling collection operational mode, an angle in counter-clockwise sense between a vertical plane running through the pivot axis and an intersecting plane running through the pivot axis and coinciding with a centre plane of the bracket lies in the range between 30 and 60 degrees, in particular in the range of about 55 degrees.

Respective angles and orientations are also described further below in connection with FIG. 15 and FIG. 16, and it shall be explicitly stated, that these angles and orientations may be applied to any embodiment and are not just limited to the exemplary embodiment shown in the figures.

As can be seen, the spout in particular may contribute to more efficient and simplified fruit collection.

The collecting container in embodiments may comprise or may be defined inter alia by an envelope for the inner volume, defining, with respect to the axis of rotation as defined by the stub axle section, a circumferential envelope that is permeable for fruits to be collected or intended to be collected.

The envelope may in embodiments comprise a plurality of elastic sections or elements designed and implemented such that a fruit lying on the ground can elastically deform the elastic elements, e.g. at least two adjacent elastic elements, to thereby pass through the envelope and get from the outside to the inside of the collecting container upon rolling the collecting container over or moving it over the fruit.

In embodiments, the elastic sections may comprise wires or wire bars, which may be made from a plastic, metal material and/or composite material, in particular reinforced material.

In particular embodiments, the wire bars, may have a diameter in the range between 1.0 mm to 1.5 mm, or 1.1 mm to 1.4 mm, or 1.25 mm to 1.3 mm. Such diameters in particular have turned out to have sufficient bendability and at the same time sufficient flexibility to allow collecting of fruits without significantly injuring the skin of the collected fruits.

A collecting container having an envelope in accordance with the embodiment mentioned above may be rolled on the floor by a user, and fruits can be picked up by rolling the collecting container over the fruits whereby respective fruits can pass, in particular in a transversal direction relative to the pivotal axis, the envelope in a direction transversal to the axis of rotation of the collecting container.

Coming now back to the hub, in particular integral hub, it may in embodiments be implemented on, provided on, or associated with a first arm of the retaining bracket. Similar as indicated above, the hub may be implemented as an integral, one-piece part of the arm and/or bracket. In different embodiments, the hub may be adapted to be detachably coupled or mounted to the bracket and/or arm. Suitable connections or coupling interfaces for a detachable connection have been discussed further above.

In further embodiments, a bearing mounting, in particular an integral bearing mounting, may be implemented on a second arm of the retaining bracket.

The first and second arm may be implemented as arcuate sections of the retaining bracket, preferably extending symmetrically from a common base section. The first and second arm may form a continuous, in particular U-shaped component of the retaining bracket. The arms may be made from plastic, in particular reinforced plastic and/or metal-plastic composites.

The hub and bearing mounting may be implemented on first and second extensions of the first and second arm. The first and second extensions may extend parallel to each other and in a direction away from the base section.

In alternative embodiments, the hub and bearing mounting may be implemented as detachable components implemented to be detachably fitted with or on first and second extensions of the first and second arm. The first and second extensions in this configuration may also extend parallel to each other and in a direction away from the base section The base section of the retaining bracket may in embodiments comprise an interface for fixing the retaining bracket to an elongated handle, in particular for detachably fixing the retaining bracket to an elongated handle in a manual operation. The base section in particular may be implemented to merge into an elongated handle for manual operation.

In embodiments and according to an aspect of the invention that may be separately claimed, the retaining bracket according to any embodiment and variant described herein, in particular the base section thereof, may comprise a clutch, in particular a standardized clutch, or coupling adapted to exchangeably couple the base section to a counter-clutch provided on a handle, in particular multi-functional handle. A connection between the counter-clutch and clutch of the base section may be of push-and-snap type, or may comprise a screw fastening mechanism, or others.

In a further aspect of the invention which may be claimed as well, a fruit collector may be provided in which a fruit collecting tool comprising a pivotable fruit collecting container, has an adapter unit, or connector, in particular a plug-in-connector, or plug coupling interface which is arranged to be releasably coupled to a counterpart or complementary adapter unit, connector, and/or plug coupling interface.

The adapter unit, connector, and/or plug coupling interface may be provided, in particular integrally designed or fixedly or releasably mounted to a retaining bracket as described herein and configured for pivotably retaining a fruit collecting container adapted for rollable collection of fruits or other objects that have similar shapes as compared to fruits.

Regarding the bearing mounting, it may be configured and arranged to retain or accommodate the collecting container at an axial end that is located opposite to the stub axle section.

The bearing mounting may be arranged to retain the collecting container to be pivotable around an axis defined by and centrically running through the bearing mounting and hub of the retaining bracket. The bearing mounting and corresponding axle of the collecting container arranged opposite to the stub axle section, may be implemented as a shaft-and-hub type joint. The hub may be implemented at the second arm or bracket and the shaft may be provided to protrude from an axial end of the collecting container, or vice versa.

The bearing mounting and hub, as well as the stub axle sections of the collecting container may be implemented in such a way that the collecting container can be pivotably fixed or clamped between the first and second arm.

For coupling the collecting container to the bearing mounting, the collecting container may comprise at an axial end located opposite to the stub axle section an additional or auxiliary stub axle section. Using or providing the additional or auxiliary stub axle section, a two-sided suspension of the collecting container is possible. However, it shall be noted that within the scope of the present invention it is possible that the collecting container is coupled with the stub axle having the through opening to the hub only, which in particular shall mean that the collecting container may be retained by the hub in a one-sided suspension.

The additional stub axle section may be configured to and implemented to protrude from a plate or cup shaped attachment collecting container flange or collecting container hub. The additional stub axle section may be implemented as a protruding section adapted to be pivotably accommodated in a corresponding additional hub section. In particular, the additional stub axle section may be a solid axle, preferably of limited outer diameter as compared to the diameter of the hub, for example with an outer diameter in the range between 0.5 cm to 3 cm.

The attachment flange may extend radially relative to the additional stub axle section and may be configured to be coupled to the envelope, or at least elements making up the envelope of the collecting container.

As can be seen, a straightforward handling, operation and efficient fruit collection can be obtained by the proposed embodiments related to fruit collector, collecting container and/or retaining bracket.

Coming now to the fruit collecting container, i.e. the collecting container, it may comprise at an axial end thereof a stub axle section having a central through-hole sized and dimensioned so as to enable fruits to be collected to move or be moved into the collecting container, wherein the stub axle section may be configured to cooperate or to be coupled with the hub. This in particular shall mean that the collecting container may comprise an axial opening implemented at the stub axle section as an inner, central through-hole. The opening or through-hole may be used to collect fruits by moving fruits through the opening into the collecting container, but may advantageously be used for removing the fruits via the opening from the collecting container. The opening may be adapted such that one fruit at a time can pass through.

The stub axle section may be implemented such that it can cooperate or be coupled with the hub, in particular integral hub, of the retaining bracket. In particular, the stub axle section may be configured such that the through-hole is in alignment with the central hole of the hub when the collecting container is coupled to or with the hub of the retaining bracket.

An alignment between the through-hole and central hole may be such that a passageway from the outside to the inner volume of the collecting container is formed. Via such a passageway, fruits can on the one hand be removed from the collecting container, and on the other hand can be collected by picking them up and passing them through the passageway to the inner volume of the collecting container. The passageway may be configured in such a way that its diameter can be adapted to different fruit sizes or diameters. As an example washer plates or similar may be used for individual adaptation of the diameter of the passageway.

In embodiments, the stub axle section may comprise a bearing or sliding surface, in particular of ring-shaped configuration, which may be adapted to cooperate in the mounted state with a counterpart bearing or sliding surface of the hub. The bearing or sliding surface may be an inner or also an outer surface, wherein the counterpart bearing or sliding surface of the hub then may be implemented as an outer or inner surface.

The bearing surfaces, the central hole of the hub and/or the through-hole of the stub axle section may be configured such that a pivotal axis defined by the bearing surfaces for rotating the collecting container when mounted to the bracket coincides with a central axis running through the centre of the hole and/or through-hole.

The bearing or sliding surfaces may be implemented as outer or inner radial surfaces.

One of the bearing or sliding surfaces may comprise friction reducing components or structural elements suitable for reducing friction between the bearing or sliding surfaces. These friction reducing components or structural elements may comprise protrusions and/or depressions, in particular beads and/or bulges and the like, suitable for reducing frictional forces acting between the sliding or bearing surfaces. The friction reducing components may for example be provided in axial and/or radial direction relative to the pivotal axis, and may in addition be configured to avoid jamming of a pivoting movement of the collecting container.

In embodiments, the fruit collecting container may comprise an additional or a further stub axle section implemented at an axial end of the collecting container that is averted or oriented away from the stub axle section intended to cooperate with the hub. The additional stub axle section in particular may be implemented as a shaft configured to cooperate with a corresponding bearing implemented at the retaining bracket.

The further stub axle section may comprise a plate hub with a centred axle stub or shaft projecting therefrom. The axle stub or shaft may be configured in such a way that it can cooperate with the bearing mounting of the retaining bracket. Note that it can be considered as an equivalent solution for the further stub axle section or shaft if the collecting container comprises a bearing mounting and the retaining bracket comprises a corresponding axle stub or shaft.

In embodiments, the collecting container may comprise an envelope defining an inner volume of the collecting container. The envelope may be made from a flexible material and be arranged to enable fruits passing through the flexible envelope into the inner volume of the collecting container upon rolling the collecting container and envelope over fruits.

In embodiments, the stub axle section or the additional stub axle section or both stub axle sections may comprise a mounting portion, or mounting portions, configured and designed for mounting the envelope to the respective stub axle section.

The mounting portion may comprise a circumferential mounting groove or a plurality of circumferential mounting slots, configured to accommodate sections or respectively one of a plurality of end sections of the envelope.

The mounting groove or mounting slots may be oriented in axial direction with respect to a pivoting axis of the collecting container. The opening of the mounting groove and mounting slots may face away or be averted from the bearing or sliding surface of the stub axle section. In particular, they may face towards the inner or centre part of the collecting container.

The mounting groove and mounting slots may, with respect to their depth direction, be oriented or aligned in parallel to the pivoting axis of the collecting container, or they may be angled or slanted away from or towards the pivotal axis, preferably by an angle of less than 90 degrees, more preferably by an angle of less than 60 degrees.

In embodiments, the envelope may comprise a plurality of elongated and flexible bars, rods, stripes or wires, wherein an axial end of each of the bars, rods, stripes or wires may be fixed in the mounting groove or in a respective mounting slot. In such a way, a collecting basket may be provided in which the bars extend from one stub axle section to the other, i.e. over the whole width relative to the direction of the pivot axis, in particular without crossing each other, such that a fruit can enter the collecting container by spreading and pushing apart the flexible bars to generate a passage suitable for moving into the collecting container.

The bars, rods, stripes or wires may be made from plastic and/or metal, and designed sufficiently robust such that the collecting container can be moved over the ground in order to collect fruits by using the circumferential bars as a running surface.

The bars, rods, or stripes may have a diameter as indicated further above. Further, a length of the bars, rods, or stripes may be such that the collecting container has length between 20 cm and 80 cm.

In embodiments, the stub axle section may comprise a plurality of spacer lugs, projecting in axial direction with respect to a the pivoting axis of the collecting container, and designed such that each pair of adjacent bars, rods, stripes or wires of the envelope is separated in, near, or at the mounting groove or mounting slots by a respective spacer lug.

Via the spacer lugs, the orientation and mutual spacing of the bars, rods, stripes or wires may be properly adjusted. Further, such spacer lugs may provide enhanced stability, and in addition may positively affect bending properties, in particular bending resistance, of the bars, rods, stripes or wires in circumferential direction of the collecting container. In addition, the spacer lugs may be used to provide adequate and suitable distances, in particular fruit specific distances, between adjacent bars, rods, stripes or wires of the envelope.

In embodiments, each bar, rod, stripe or wire may comprise at an axial end thereof, in particular on both axial ends, intended to be coupled with the mounting groove or a respective mounting slot, a hook type portion. The hook-type portion in particular may comprise a spring element or spring section configured to generate spring elastic forces for engaging and/or snapping-in a respective axial end into the mounting groove or mounting slot. In particular, the hook type portion may be configured to engage the axial end in or within the mounting groove or mounting slot in form-locking or snap-locking mechanical connection.

Regarding form-locking connections, the hook type portion, i.e. a bended end section of a respective bar, rod, stripe, or wire may firmly engage a wall of the mounting groove or mounting slot.

Regarding snap-locking connections, a hook type portion, for example in form of a bent end section of a respective bar, rod, stripe, or wire may be implemented to snap behind a shoulder or recess provided in, at, or near the mounting groove or mounting slot to thereby preventing the bar, rod, stripe, or wire from unintentionally sliding out of the mounting groove or mounting slot. Providing non-destructive snap-type connections, such as mentioned beforehand, may ease the replacement of defect bars, rods, stripes, or wires.

In embodiments and according to an aspect of the invention that may be separately claimed, a collecting container is provided, which may be configured according to at least one embodiment or variant as described above. The collecting container may be configured to be pivotable around a pivot axis and operable to pick up objects, in particular fruits, by rolling an envelope of the collecting container over the objects in a pivoting movement of the collecting container around the pivot axis. By rolling the envelope over the objects to be picked up, the objects may elastically deform the envelope to thereby generate a gap for passing through the envelope and enter the collecting container. Thereafter, the envelope may, by the action of the elastic forces of the envelope, return to its ordinary configuration again and enclose the collected objects to prevent them from escaping or dropping out through the envelope and collecting container.

The collecting container of this embodiment comprises at an axial end, relative to the pivot axis, a discharge opening for discharging therethrough collected objects out of the collecting container.

The discharge opening may for example have a diameter of about 200 mm.

The advantage of an axial discharge opening, as has already been discussed further above, is that it enables a comparatively quick discharge of fruits or objects out of the collecting container.

Thus, with the proposed collecting container, objects or fruits may be specifically picked via the envelope by rolling the collecting container, and therewith the elastic envelope, over the ground and over the objects, whilst a quick discharge is possible via the axial discharge opening, by tipping over the collecting container such that the discharge opening faces downwards to enable objects located within the collecting container to drop out of it by the action of gravity.

The envelope of the embodiment described previously may comprise a plurality of elastic, bulged wire straps, preferably made from stainless steel, attached at both ends at stub axles or hubs provided at axial ends of the collecting container, and extending, relative to the pivot axis, in axial direction of the collecting container.

The wire straps may be attached at the stub axles with a mutual distance of 25 mm, in particular relative to the circumferential direction. The wire straps attached at the stub axles may form a body having a diameter of about 350 mm.

Further, the collecting container, for example configured according to the embodiment described previously, may be rotatably attached to an operating handle by means of slip rings. The slip rings may be provided at bracket arms of a forked, cantilevered bracket in particular resembling a wheel fork.

The operating handle may be made from aluminum, and in embodiments may comprise at an upper end a half shell for engagement with the forearm of a human operating user. The half shell may be welded to the operating handle. The operating handle may be implemented to be dismountable, for example in instances like shipping or sending by post.

In embodiments, at a distance of for example 250 mm downwards from the upper end of the operating handle, a cantilever arm projecting laterally, for example by a length of 450 mm, from the operating handle may be provided. The cantilever arm may be provided to enable the operating user to control movements of the operating handle with both hands. The cantilever arm may advantageously also be used by the operating user for rotating the collector device, i.e. collector assembly formed by the operating handle and collecting container, in order to tip over the collecting container to thereby discharge objects contained within the collecting container.

In connection with a collector device comprising a collecting container attached to an operating handle, in particular in accordance with the embodiments as described beforehand, the collector device may in embodiments comprise a pair of fixed rollers configured and adapted to carry or bear, in particular during transport, the weight of the collecting container, in particular the weight of the content of the collecting container. Further, the fixed rollers are preferably adapted and configured, such that, when the collecting container is emptied, the collector device can be left free standing on the ground.

Coming now to the fruit collector, which may comprise a collecting container and a retaining bracket in accordance with any embodiment or variant described herein, it is implemented such that the collecting container may be pivotably associated with the retaining bracket.

The collecting container may be coupled via the stub axle sections to the hub and bearing mounting of the retaining bracket.

In this configuration, the fruit collecting container may be rolled over the ground by adequately guiding the retaining bracket, thereby picking up fruits upon rolling the envelope of the collecting container over the fruits.

The retaining bracket may comprise an integral handle extending therefrom for mechanically operating the collecting container and moving the same during picking and collecting actions. In the alternative, the retaining bracket may comprise an interface or port configured to be coupled with a corresponding counterpart interface or port of a multiple-use handle.

As can be seen, the retaining bracket, collecting container, and fruit collector in accordance with embodiments of the invention as described herein are suitable to ease the collection and picking up of fruits, and are open to be adapted to a variety of fruits and collecting conditions.

Below, exemplary embodiments of the invention will be described in connection with the annexed figures, in which FIG. 1 shows a fruit collector in accordance with an exemplary embodiment;

Figure 1:
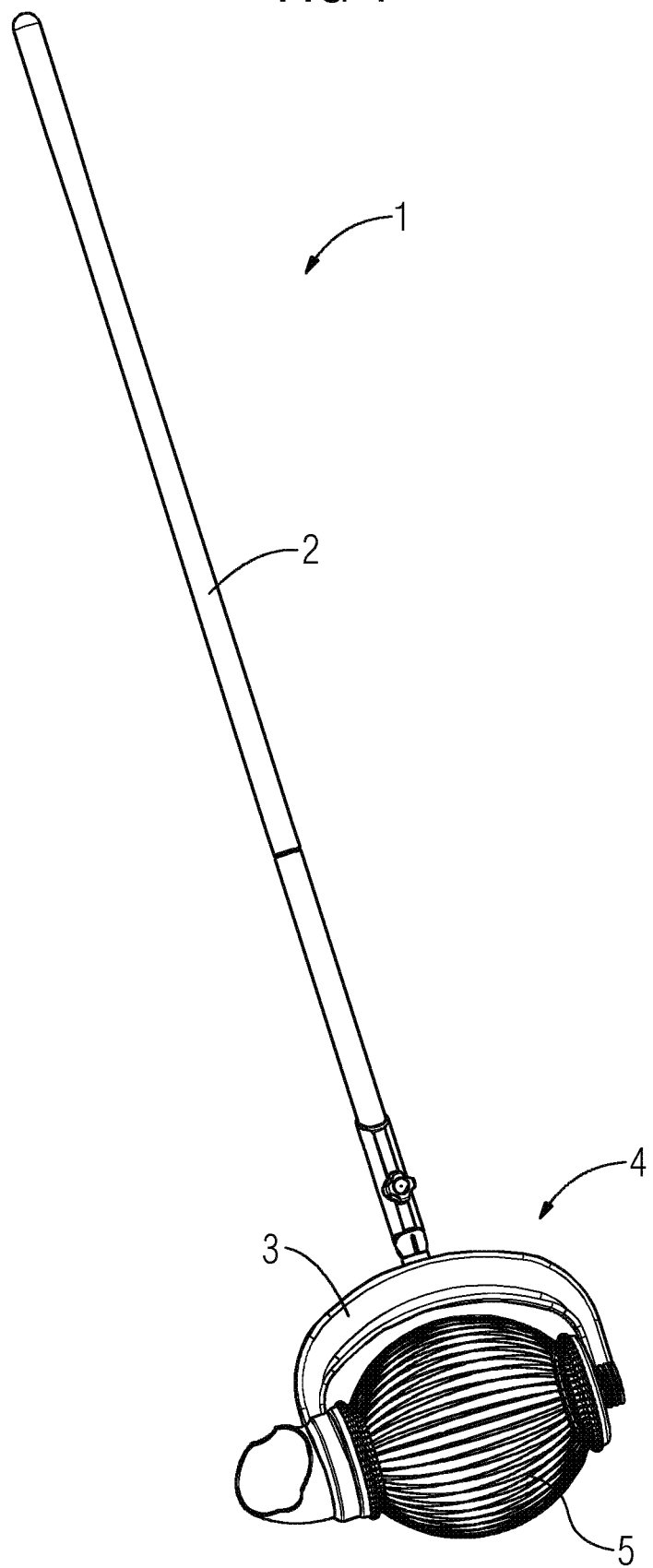

FIG. 1 shows a fruit collector 1 in accordance with an exemplary embodiment of the invention. The fruit collector 1 comprises a handle 2 and a retaining bracket 3 which is removably attached to the handle 2.

The handle 2 and retaining bracket 3 may comprise mutually fitting interfaces or interface ports for easily coupling and uncoupling the retaining bracket 3 and handle 2.

The fruit collector 1 according to the embodiment in FIG. 1 comprises a fruit collecting container 4 which is pivotably coupled to the retaining bracket 3.

In the configuration shown in FIG. 1, the collecting container 4 may be rolled on the ground, and moving the collecting container 4 over a fruit may result in passing a fruit that is rolled over through the envelope 5 of the collecting container 4 to the inside or inner volume of the collecting container 4 thereby collecting respective fruits.

Figure 2:
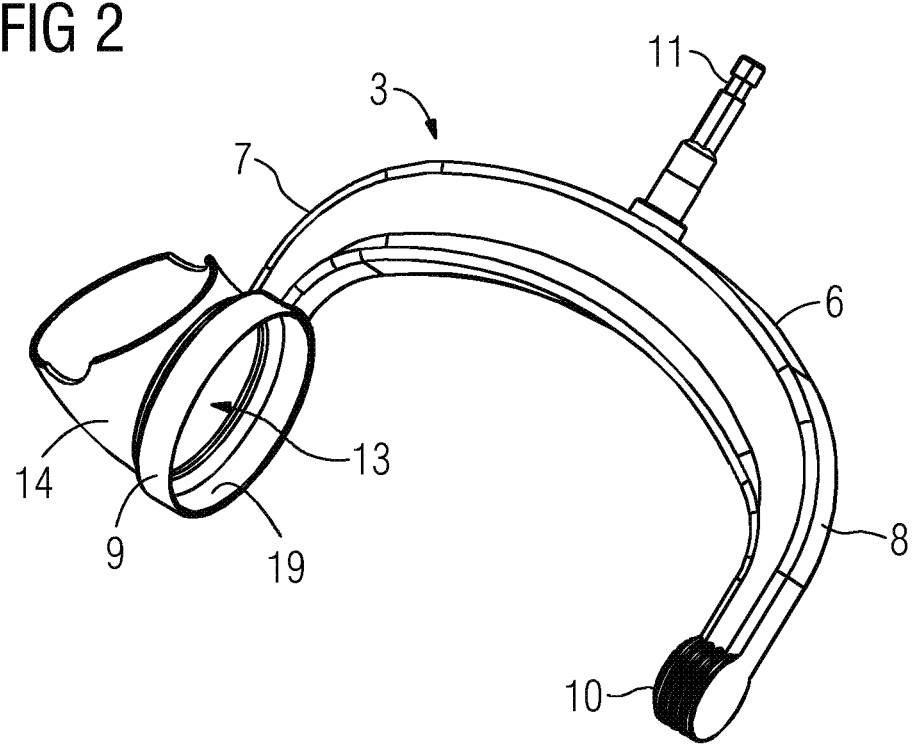
FIG. 2 shows a retaining bracket of the fruit collector in accordance with an exemplary embodiment.

FIG. 2 shows a retaining bracket 3 of a fruit collector 1 in accordance with an exemplary embodiment of the invention in more detail.

The retaining bracket 3 may comprise a C-shaped bracket body 6 with two bracket arms, i.e. a first bracket arm 7 and a second bracket arm 8 extending in a same direction from the bracket body 6.

The retaining bracket 3 in particular is arranged to pivotably support the collecting container 4. Therefore, the retaining bracket 3 comprises a hub 9, which in the present exemplary embodiment is implemented as an integral part and in a one-piece configuration with the first bracket arm 7, i.e. the hub 9 is implemented as an integral hub.

Further, the retaining bracket 3 may comprise as an integral part in a one-piece configuration with the second bracket arm 8 a bearing mounting 10.

The retaining bracket 3 in the embodiment shown in FIG. 2 comprises in a central position of the bracket body 6 a coupling interface 11 projecting from the bracket body 6 on a side averted from the bracket arms 7, 8.

The hub 9 in the embodiment shown in FIG. 2 is adapted to pivotably retain a stub axle section 12 of the collecting container 4. The stub axle section 12 is shown and depicted in FIG. 3 showing an embodiment of a collecting container 4.

Figure 3:
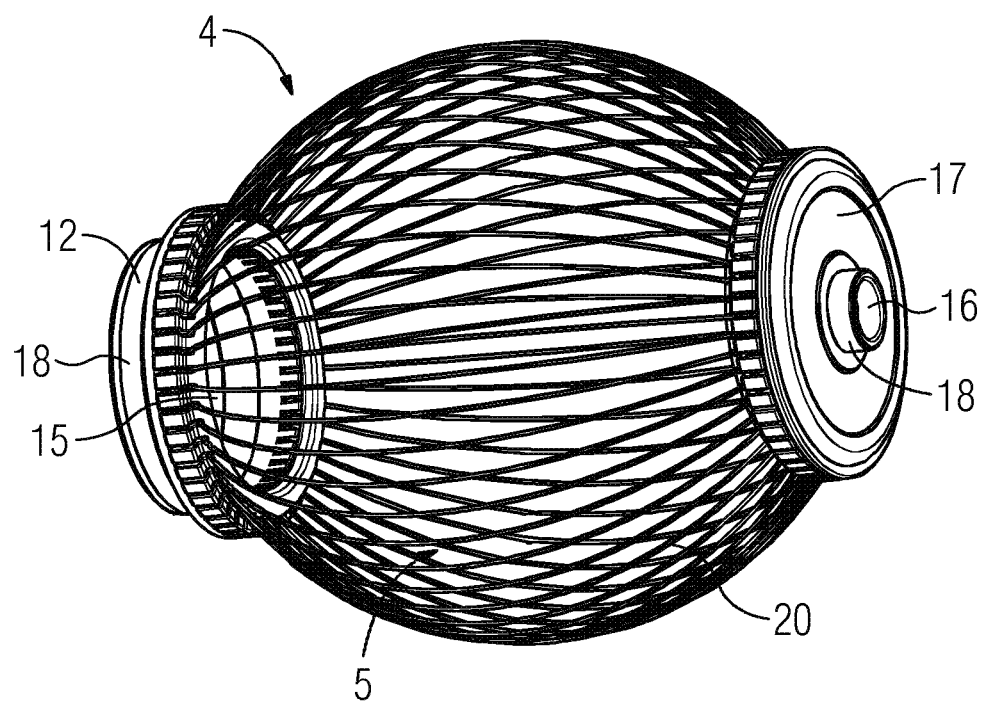
FIG. 3 shows a collecting container of the fruit collector in accordance with an exemplary embodiment.

As can be seen from FIG. 3, the stub axle section 12 of the collecting container 4 may be implemented at an axial end of the collecting container 4 and project from the axial end in a direction oriented away in axial direction from the collecting container 4.

As can be seen from FIG. 2, the retaining bracket 3, in particular the hub 9 comprises an inner or central hole 13 defining a passage of size and dimension to enable fruits of the type to be collected passing through.

As can also be seen from FIG. 2, the retaining bracket 3, in particular the hub 9 may comprise on an outer side thereof a spout 14 which is in integral design and in the present case in a one-piece configuration with the first bracket arm 7. The spout 14 may, in accordance with the embodiment in FIG. 2, be implemented as a bent pipe end section.

The spout 14 in particular may have an inner opening communicating and being aligned with the central hole 13 of the hub 9. Due to the bent pipe end configuration, the spout 14 comprises an outer opening having a plane that is tilted relative to the plane of the inner opening and central hole 13 of the hub 9.

The bent configuration of the spout 14 as shown in connection with the embodiment according to FIG. 2 may serve to prevent collected fruits from falling or slipping out of the collecting container 4 during rolling the collecting container over the ground.

Further, the bent structure of the spout 14 may serve as a type of shovel or groove via which fruits can be picked up in order to pass them through the spout 14 and central hole 13 into the inner volume of the collecting container 4. This may be of advantage for oversized fruits or fruits of abnormal shape.

Further, the collecting container 4 can be emptied in a simple way by twisting the fruit collector 1 such that the central hole 13 and spout 14 face downwards so that fruits contained in the collecting container 4 can exit via the central hole 13 and spout 14.

In addition, it shall be mentioned that the spout 14 may be used and designed such that a user is able to specifically pick up fruits not only from the ground, but also from trees.

Turning now to FIG. 3, it can be seen that the collecting container 4 comprises the stub axle section 12 at an axial end thereof, which stub axle section 12 may comprise a through hole 15.

The through hole 15 may be sized and dimensioned so as to enable a passage of fruits to be collected into the collecting container 4. The size of the through hole 15 may be matched with the central hole 13 of the hub 9.

In the mounted configuration, i.e. in which the collecting container 4 is coupled to the retaining bracket 3, the through hole 15 may be aligned with the central hole 13 of the retaining bracket 3 or hub 9. In this way, fruits can pass from and into the inner volume of the collecting container 4 via the spout 14, through hole 15 and central hole 13.

The spout 14, through hole 15 and central hole 13 may be considered as defining a kind of axial passageway into and out of the collecting container 4.

Figure 4:
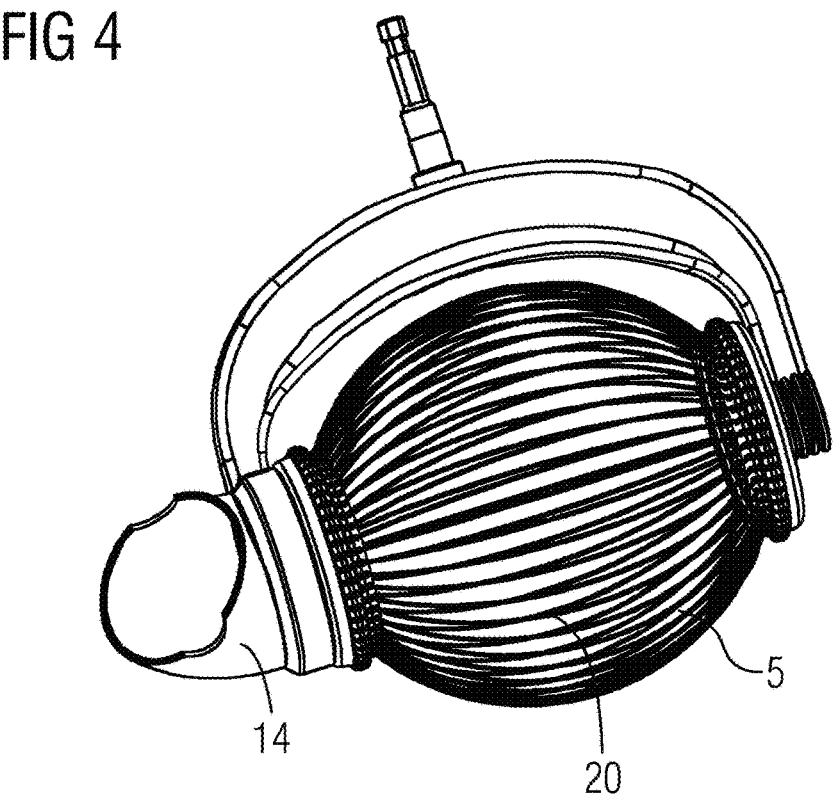
FIG. 4 shows a first detailed view of an embodiment of the retaining bracket and collecting container coupled to each other.
Figure 5:
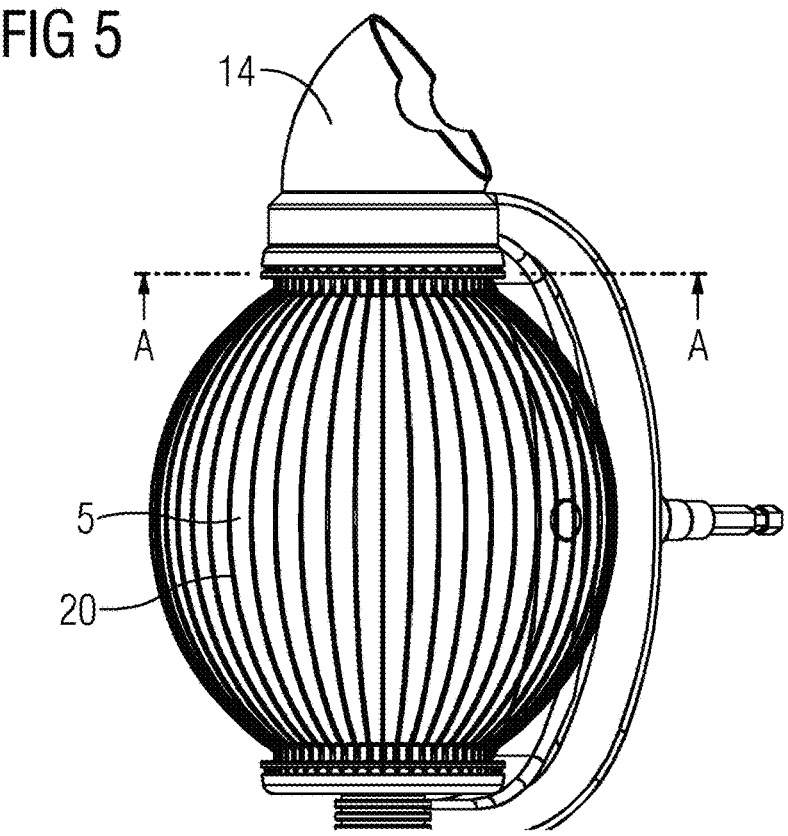
FIG. 5 shows a second detailed view of an embodiment of the retaining bracket and collecting container coupled to each other.

As can be derived from FIG. 4 and FIG. 5, respectively showing detailed views of a section of a fruit collector 1, in particular of the retaining bracket 3 and collecting container 4 in the mounted state, the central hole 13 is arranged to communicate via the through hole 15, defining an axial collecting container opening at the stub axle section 12, with the collecting container inner volume.

As can be derived from a combination of FIG. 2 to FIG. 5, the bearing mounting 10 implemented in integral design at the second bracket arm 8 is configured to retain the collecting container 4 to be pivotable around a pivot axis defined by the bearing mounting 10 and hub 9.

The collecting container 4 may, as can be seen from FIG. 3, comprise an additional stub axle section 16 implemented at an axial end of the collecting container 4, which is averted from the axial end where the other stub axle section 12 that is adapted to cooperate with the hub 9 is provided.

The additional stub axle section 16 may comprise, as can be seen from FIG. 3, a plate or cup-shaped attachment flange 17 or hub from which the additional stub axle section 16 projects in axial direction.

The additional stub axle section 16 is adapted to be inserted into the bearing mounting 10 to thereby couple them together such that the collecting container 4 is pivotable, in the present embodiment, around its longitudinal axis.

The stub axle sections 12, 16 in the embodiment shown in the figures comprise outer sliding surfaces 18 adapted and shaped to cooperate in the mounted configuration with inner sliding surfaces 19 provided in or on the hub 9 and bearing mounting 10, respectively.

It shall be noted, that the additional stub axle section 16, which in the figures is implemented as a type of hollow axle, may in other embodiments be implemented as a solid axle, in particular having a smaller outer diameter as the additional stub axle section 16 shown in FIG. 3 for example.

By mounting the collecting container 4 to the retaining bracket 3, which may be obtained by compressing the collecting container in axial direction and fitting it to the retaining bracket 3, the sliding surfaces 18, 19 mutually engage so that the collecting container 4 is pivotably supported on the retaining bracket 3.

A pivot axis around which the mounted collecting container 4 can pivot may be defined by an axis passing through the centre of the hub 9 and the centre of the bearing mounting 10.

As can in particular be seen from FIG. 3 to FIG. 5, the collecting container 4 comprises an envelope 5 that defines the inner volume of the collecting container 4.

The envelope 5 comprises a plurality of wire bars 20 that are bent outwardly such that the volume of the collecting container 4 has an overall convex shape.

The envelope 5 may for example comprise a number of 52 (fifty two) wire bars, which has been proven optimal for collecting fruits such as apples, pears, as well as nuts and others.

The wire bars may be bent and fixed in such a way that a final outer working diameter of the collecting container 4 is in the range of about 22 cm.

The diameter of the wire bars 20 may range between 1.2 mm and 1.4 mm, in particular from 1.25 mm to 1.3 mm.

The wire bars 20 making up the envelope 5 are flexible and are mounted at each end to one of the stub axle sections 12, 16. The wire bars 20 are flexible such that upon moving or rolling the collecting container 4 over a fruit, the fruit is able to spread apart the wire bars 20 and pass into the inner volume of the collecting container 4.

Figure 6:
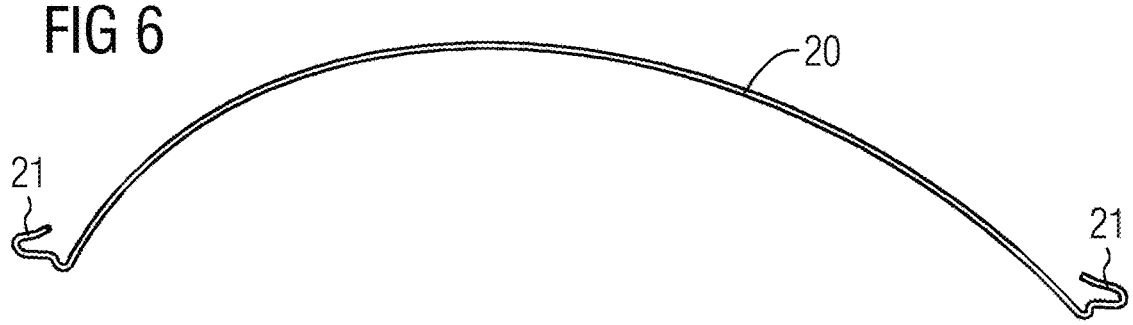
FIG. 6 shows an example of a wire bar suitable for use with an envelope of a collecting container.

An exemplary wire bar 20 is shown in FIG. 6, from where it can be seen that the wire bar 20 comprises a bent middle or centre section, and at both ends comprises hook-type portions 21 which are bent outwardly with respect to the inner volume of the collecting container 4. It shall be noted, that the hook-type portions 21 may be bent inwardly as well, and may have a different overall shape as compared to that shown in FIG. 6.

Figure 7:
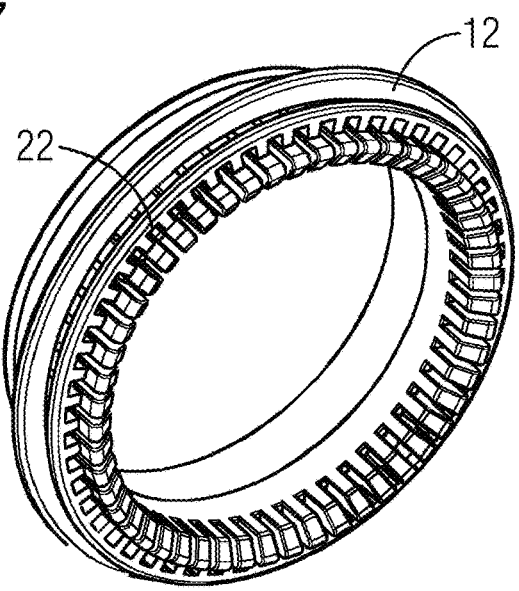
FIG. 7 shows a stub axle section of an embodiment of a collecting container.
Figure 8:
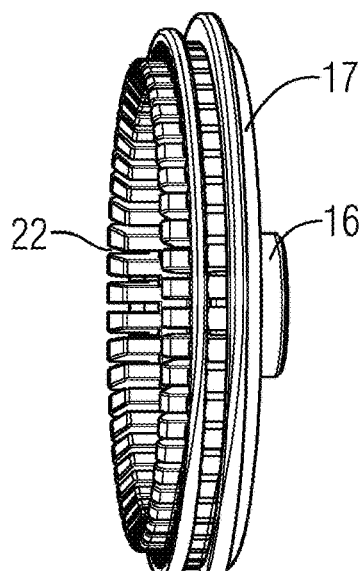
FIG. 8 shows a further stub axle section of an embodiment of a collecting container.

For mounting the wire bars 20 to the stub axle sections 12, 16 such that the wire bars 20 in the end make up the flexible envelope 5, each of the stub axle sections 12, 16 may comprise a mounting portion in form of a circumferential groove 22, which can be seen for example in FIG. 7 and FIG. 8, wherein FIG. 7 shows the stub axle section 12, and FIG. 8 shows the attachment flange 17 with the additional stub axle section 16.

Figure 9:
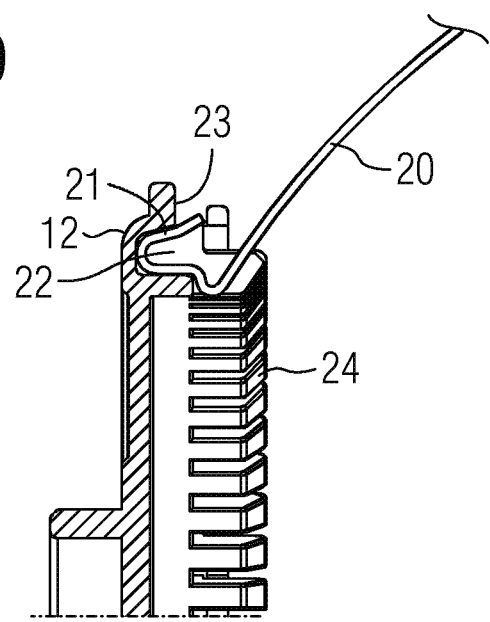
FIG. 9 shows a detail of an embodiment of a collecting container.

FIG. 9. shows an enlarged view of the groove 22 of the stub axle section 12 together with a hook type portion 21 being partially inserted into the groove 22.

The partially inserted hook type portion 21 of the wire bar 20 in FIG. 9 may be pressed and urged into the groove 22, whereby a tip end 23 of the wire bar 20 acting as a type of barb may be urged into the groove 22 and thus engage an outer inner wall section of the groove 22.

Note that instead of an engaging action of the tip end 23, it may be provided that the tip end 23 has a spring type configuration to be able to snap into a locking shoulder or the like provided within the groove 22.

As it can readily be seen from FIG. 7 to FIG. 9, the grooves 22 are oriented in axial direction of the stub axial sections 12, 16, and in the fully assembled state face each other.

A lateral support of the wire bars 20 plugged into the groove 22 may be provided by a plurality of spacer lugs 24 projecting in axial direction with respect to the pivoting axis of the collecting container 4 from the stub axle sections 12, 16.

The spacer lugs 24 may be provided such that each tip end 23 or hook type portion 21 is separated and held at an adequate distance from adjacent tip ends 23 or hook type portions in circumferential direction.

Hence, the spacer lugs 24 may provide lateral support and may define the distances between adjacent wire bars 20. Therefore, the distance between the wire bars 20 can for example be varied by modifying the width of the spacer lugs in circumferential direction.

Figure 10:
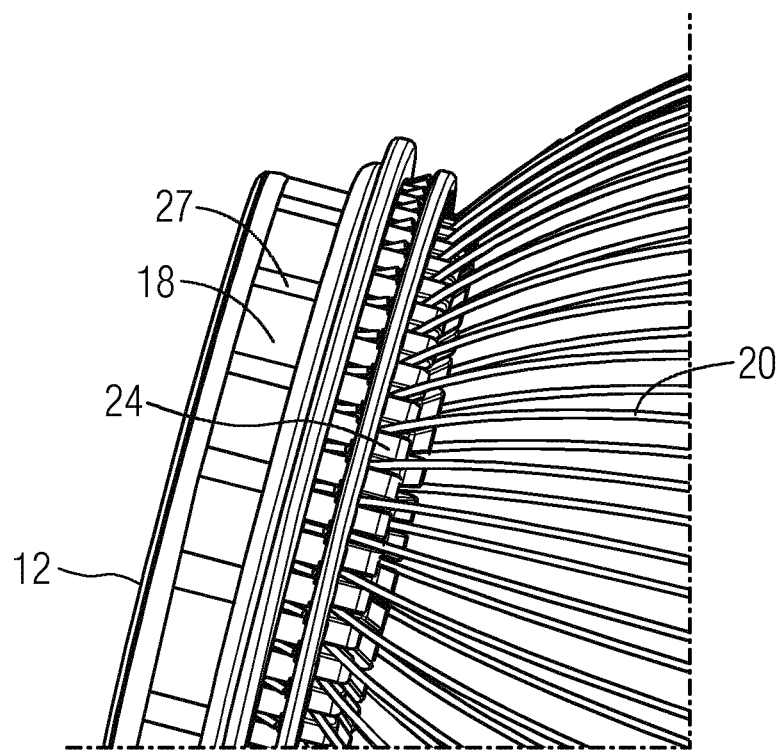
FIG. 10 shows a further detail of an embodiment of the fruit collecting container.

FIG. 10 shows a perspective view of the stub axle section 12 with a plurality of wire bars 20 mounted thereto. As can be seen, the wire bars 20 are accommodated in the groove 22 and due to their curvature and/or due to the buckling of the tip ends 23 and/or due to the orientation or tilt of the groove 22, the wire bars 20 extend from the stub axle section 12 in a slanted and bent manner, which also applies to the additional stub axle section 16, to define a convex volume for the collecting container 4.

From FIG. 10 it also can be seen, that the stub axle section 12 of the collecting container 4 comprises at an outer circumference of the sliding surface 18 friction reducing structural elements 27. Such friction reducing structural elements or components are optional, but may be used for reducing friction between the sliding surfaces 18, 19 or corresponding bearing surfaces of the stub axle section 12 and hub 9.

In the present embodiment, the friction reducing structural elements 27 are implemented in the form of rounded axial protrusions, bulges, or beads, projecting in radial direction from the outer sliding surface 18 of the stub axle section 12.

In other embodiments, the friction reducing structural elements may have other shapes and orientations, such as for example, they may be inclined relative to the axial direction and/or may extend in lengthwise direction over a section stub axle section 12 in circumferential direction. Note that friction reducing elements may instead be provided on the inner sliding surface of the hub 9.

Figure 11:
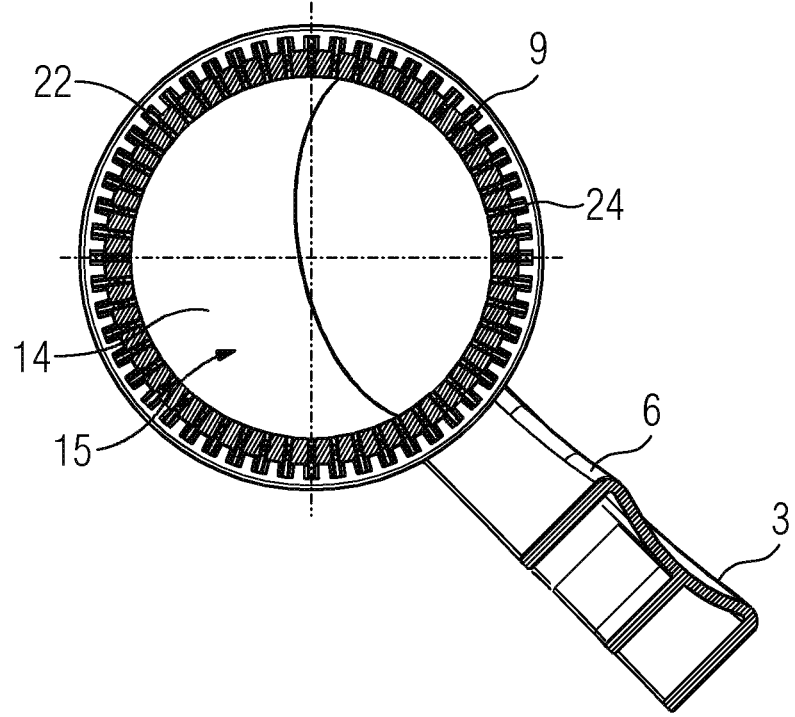
FIG. 11 shows a cross sectional view of the assembly shown in FIG. 5 along the line A-A.

An axial cross section of the retaining bracket 3 and collecting container 4 as shown in FIG. 5 along the line A-A is shown in FIG. 11.

From FIG. 11, a plan view of circumferential groove 22 and the arrangement of the spacer lugs 24 of the hub 9 can be seen. Further, it can be seen that the attachment of the wire bars 20 in the circumferential groove 22 makes it possible to implement an as large as possible through hole 15 without interfering wire bar sections or ends of the wire bar projecting into the through hole 15. Therefore, a smooth passage from the envelope 5 defined by the wire bars 20 to the stub axle section 12 and spout 14 can be obtained. This may be advantageous for passing fruits via the passageway defined by the spout 14, the through hole 15 and central hole 13 into and out of the collecting container essentially without severe injuries of the fruit skin.

As can be seen, the fruit collector 1 according to the embodiments described above and further above has many advantages, in particular with respect to fruit collecting efficiency and operability.

Figure 12:
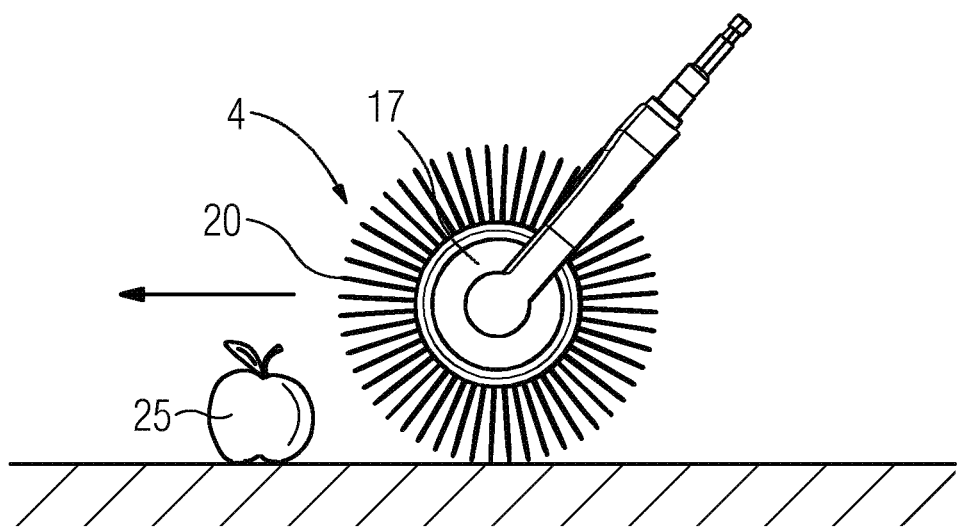
FIG. 12 shows a first side view of a section of an embodiment of a fruit collector.
Figure 13:
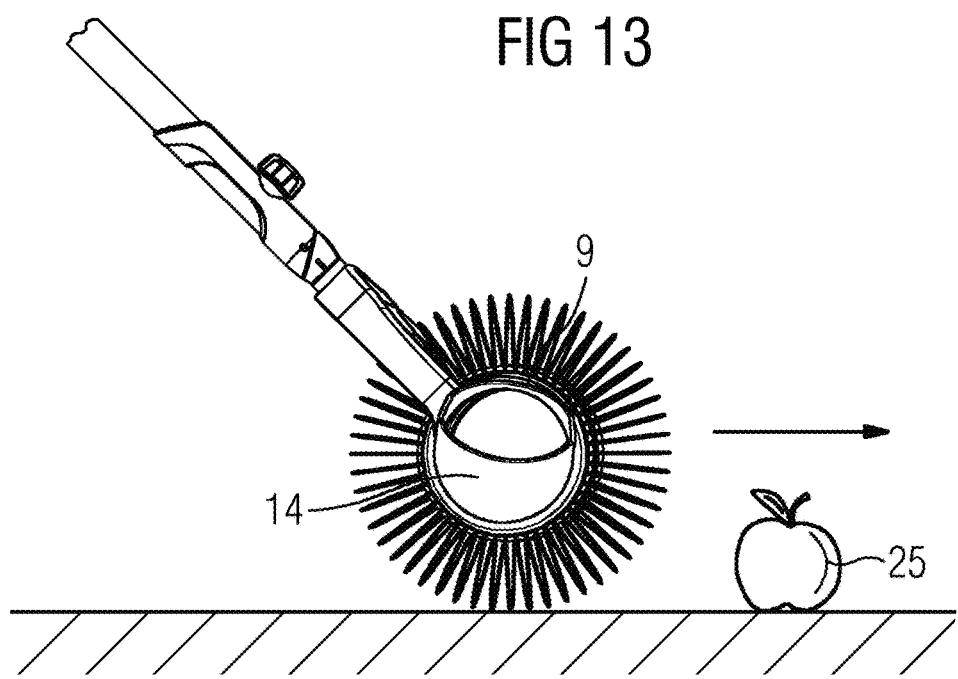
FIG. 13 shows a second side view of a section of an embodiment of a fruit collector.
Figure 14:
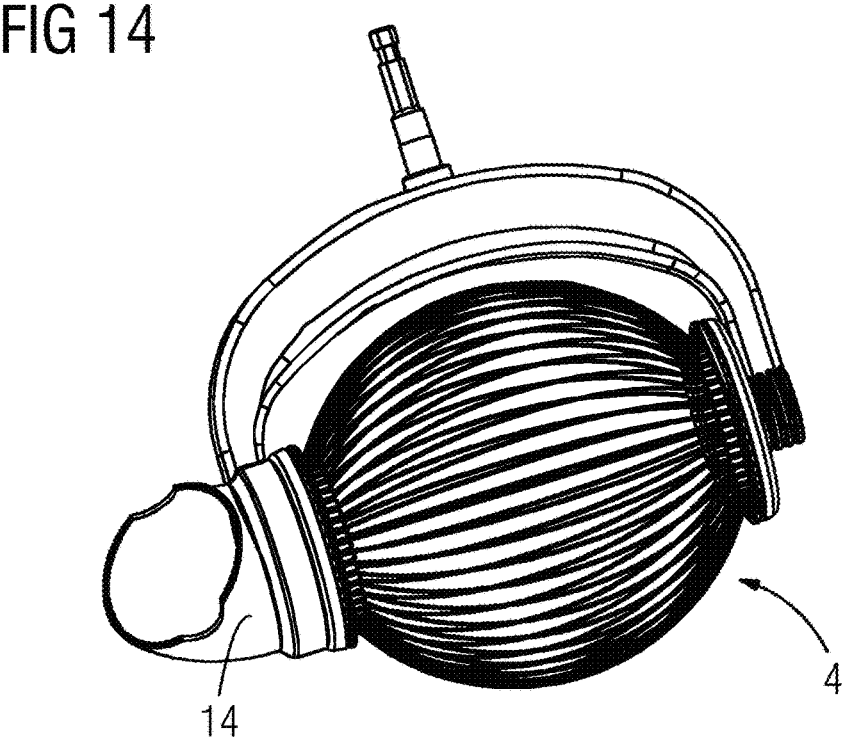
FIG. 14 shows a section of an embodiment of the fruit collector in a collecting or discharging operational position.

Operation of the fruit collector 1 may be exemplified by FIG. 12 to FIG. 14 showing different views of a section of a fruit collector in accordance with embodiments of the invention.

FIG. 12 shows a side view of the fruit collector showing the side of the attachment flange 17. In operation, the fruit collector 1 may be moved over the ground for example in forward direction which is indicated by an arrow in FIG. 12.

Movement implies that the collecting container 4, more precisely the envelope 5 or basket defined by the wire bars 20, is rolled on or over the ground.

If a fruit 25 is lying on the ground, and the collecting container 4, in particular the envelope 5 comprising the plurality of flexible wire bars 20, is moved or rolled over it, the fruit 25 will spread certain wire bars 20 apart such that a gap in the envelope 5 is generated and the fruit 25 can pass into the collecting container 4 though the permeable envelope 5.

FIG. 13 shows this situation in a side view showing the side of the hub 9 and spout 14. As becomes clear, the spout 14 is bent upwards in such a way as to impede fruits 25 already contained in the collecting container 4 from falling or slipping out of the collecting container 4.

FIG. 14 shows a perspective view of the fruit collector 1 or collecting container 4, in which the collecting container 4 is tilted and the outer opening of the spout 14 is tilted into a vertical orientation.

In this operational mode, fruits 25 lying on the ground may be picked up via the spout 24, which may for example be advantageous for picking up comparatively large fruits, or in case that a fruit is not accessible otherwise and so on.

Further, the orientation and working position as shown in FIG. 14 is also suitable for moving fruits contained in the collecting container 4 out of it in order to empty the collecting container 4.

Figure 15:
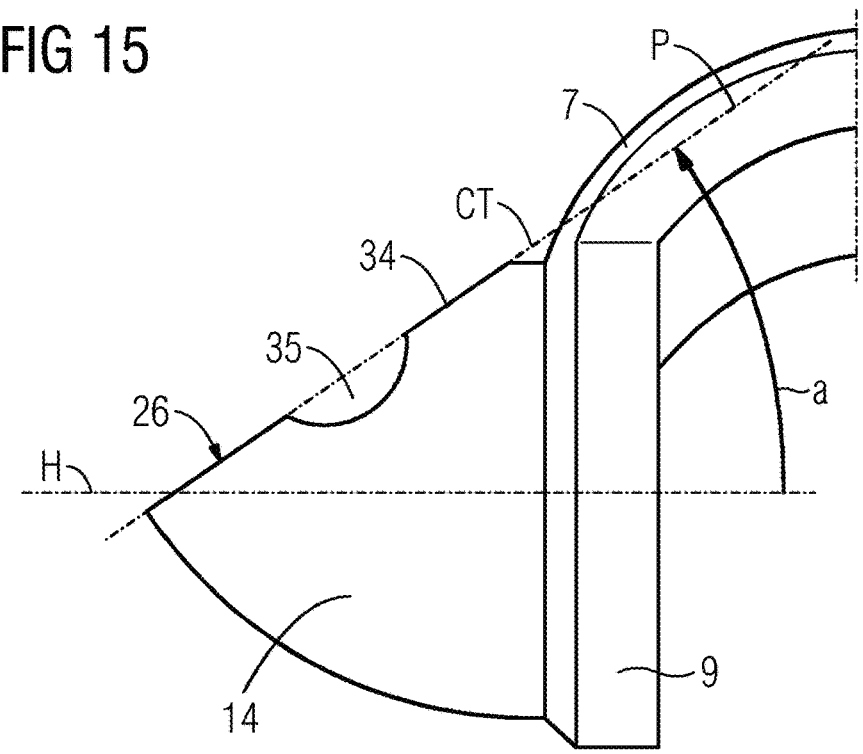
FIG. 15 depicts geometric details of spout and retaining bracket in a front view.

FIG. 15 shows geometric details and relationships of the spout 14 and retaining bracket 3 and hub 9. It can be seen from FIG. 15 that a spout opening 26 of the spout 14 averted from the hub 9 is inclined relative to the horizontal direction H, in particular relative to the pivot axis of the retaining bracket 3 and hub 9.

An inclination angle "a" which is defined in counter-clockwise sense between the horizontal axis H and a spout opening plane P may be in the range of about 35 degrees.

In particular, it has been found, that such angles are advantageous for using the spout 14 as a tool for picking up fruits whilst at the same time providing the spout 14 as a tool for preventing fruits collected in the collecting container from slipping out of the container during operation in a rolling collection mode. Further, such angles have been proven advantageous for emptying the collecting container via the spout 14.

The diameter of the spout 14 and/or of the spout opening 26 may essentially correspond to the diameter of the central hole 13 or through hole 15. The inner diameter of the spout 14, spout opening 26, inner hole 13 and/or through hole 15 may for example be as large as 90 mm.

In particular in such configurations, an outer diameter of the collecting container 4 transverse to the axial direction, i.e. to the pivot axis may be as large as 220 mm.

Other inner and outer diameters may be implemented as well, in particular in cases where the collecting container 4, and/or the hub 9, inner hole 13, through hole 15, spout 14, and/or spout opening 26 are specifically adapted and designed in size for one or more specific type of fruit.

Similarly, the inclination angle a may be varied according to the type or types of fruits for which the fruit collector is designed for.

In FIG. 15, a centre point CT of a bending radius of the spout 14, or a centre of curvature of the spout, is marked. The bending radius in FIG. 15 corresponds to a contour line of the spout 14 defined by an intersection line between a vertical plane running through the pivot axis H and the spout 14, wherein the spout 14 is oriented such that an opening plane of the spout opening 26 is perpendicular to said vertical plane.

As can be seen, the centre point CT lies outside the bracket 3. In particular, the bend and curvature of the spout 14 may be such that the centre point CT lies in or near a plane running or lying between or in a transition area between the hub 9 and spout 14.

Figure 16:
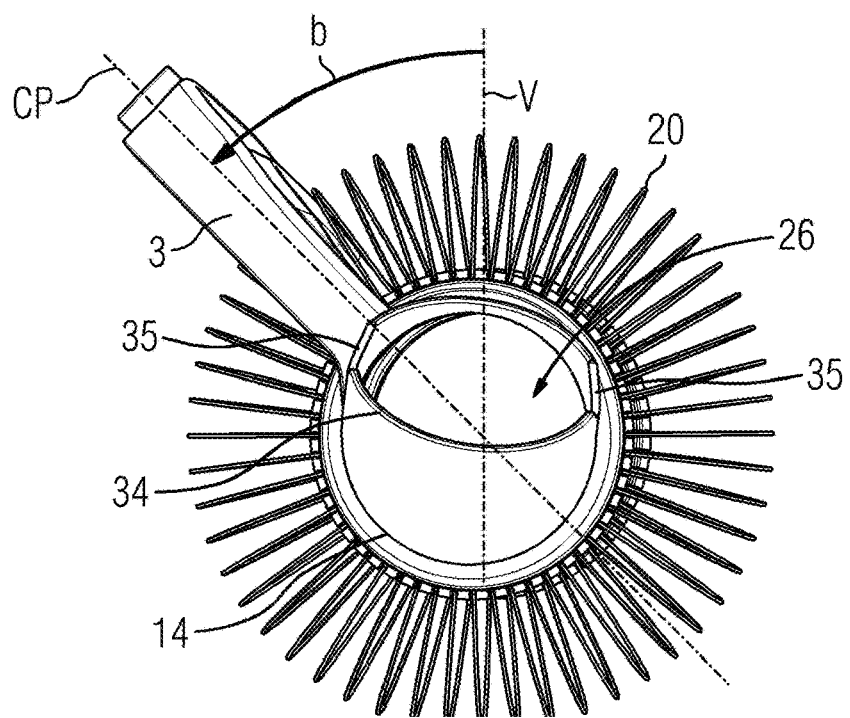
FIG. 16 depicts geometric details of the spout and retaining bracket in an axial view.

FIG. 16 shows an axial view of the collecting container 4 mounted to the bracket 3. From FIG. 16 it can be seen that the fruit collector 1 may be adapted, in particular for optimal average manual handling, such that an angle b, i.e. a working angle for manual operation, in counter-clockwise sense between the vertical plane V running through the pivot axis and a centre plane CP of the bracket 3, i.e. an angle by which the centre plane CP is twisted counter-clockwise from the vertical V, is in the range between 20 to 70 degrees, in particular in a range of about 55 degrees. This arrangement in particular is advantageous for comfortable user operation and optimal collection and/or discharge efficiency.

The embodiments as shown in FIG. 15 and FIG. 16 show another, optional, detail of the spout (14). Specifically, the spout 14 as shown in FIG. 15 and FIG. 16 comprises on its outer edge 34 a pair of recesses 35 respectively in the shape of a segment of a circle. The recesses 35 merge with the opening plane of the spout opening 26, and are placed on opposing sides of the spout 14, which can be seen in FIG. 16. The recesses 34 are provided laterally relative to the vertical plane V as shown in FIG. 16. In other words, regarding the operating mode in which collection of objects in a rolling-over movement is carried out, the recesses 35 are provided and aligned horizontally flush with each other. Recesses such as those shown and described in connection with FIG. 15 and FIG. 16 may be provided in any suitable number and position at the outer edge 34 of the spout. Such recesses 35 in particular may be helpful for picking up objects 25 from the ground, for example in situations where a rolling-over collection due to bad accessibility of the object 25, or an unimpeded collection of the object 25 by rolling the collection basket or envelope 5 over the object 25 is not possible.

Figure 17:
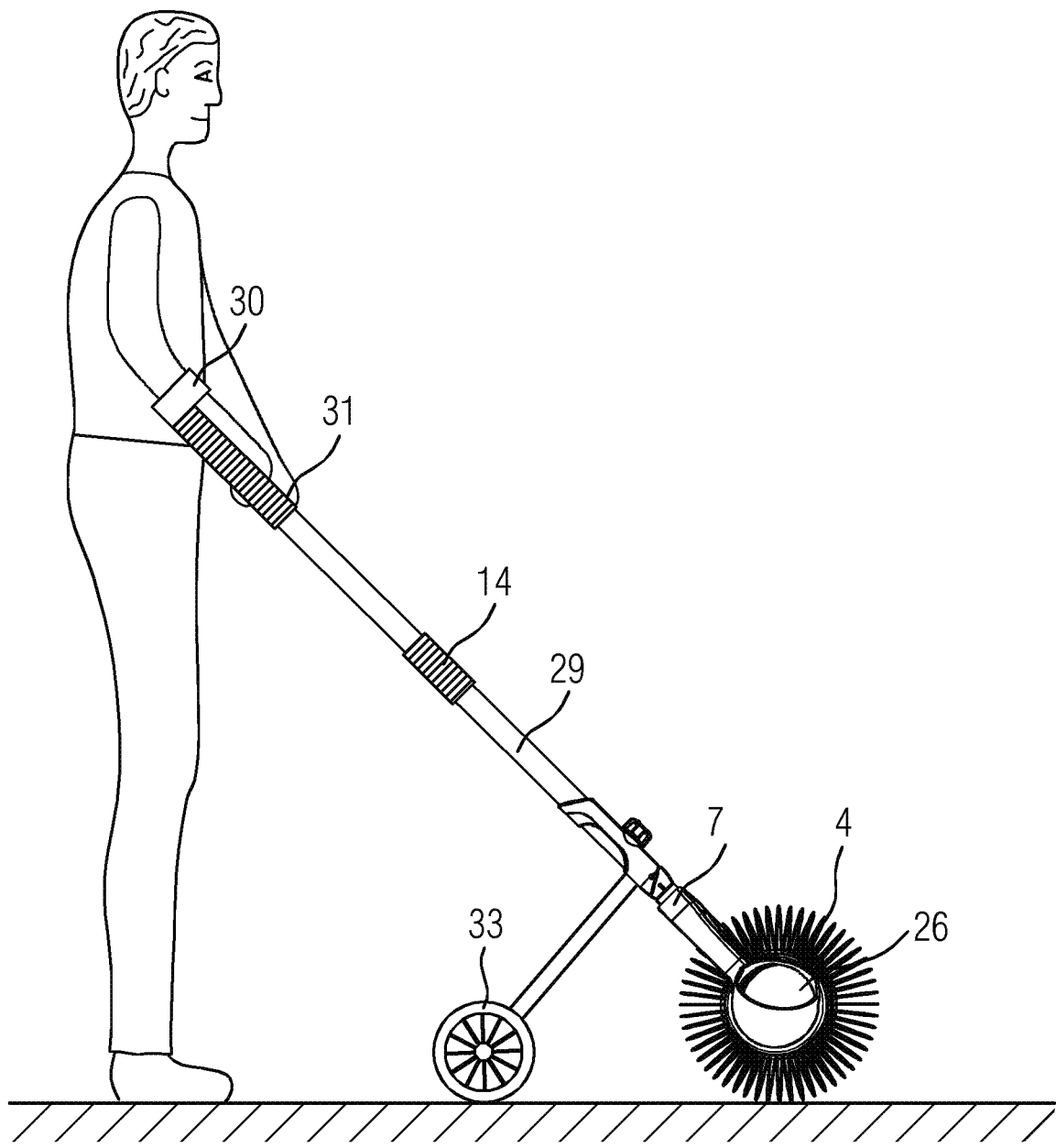
FIG. 17 shows a further embodiment of a fruit collector in a side view.
Figure 18:
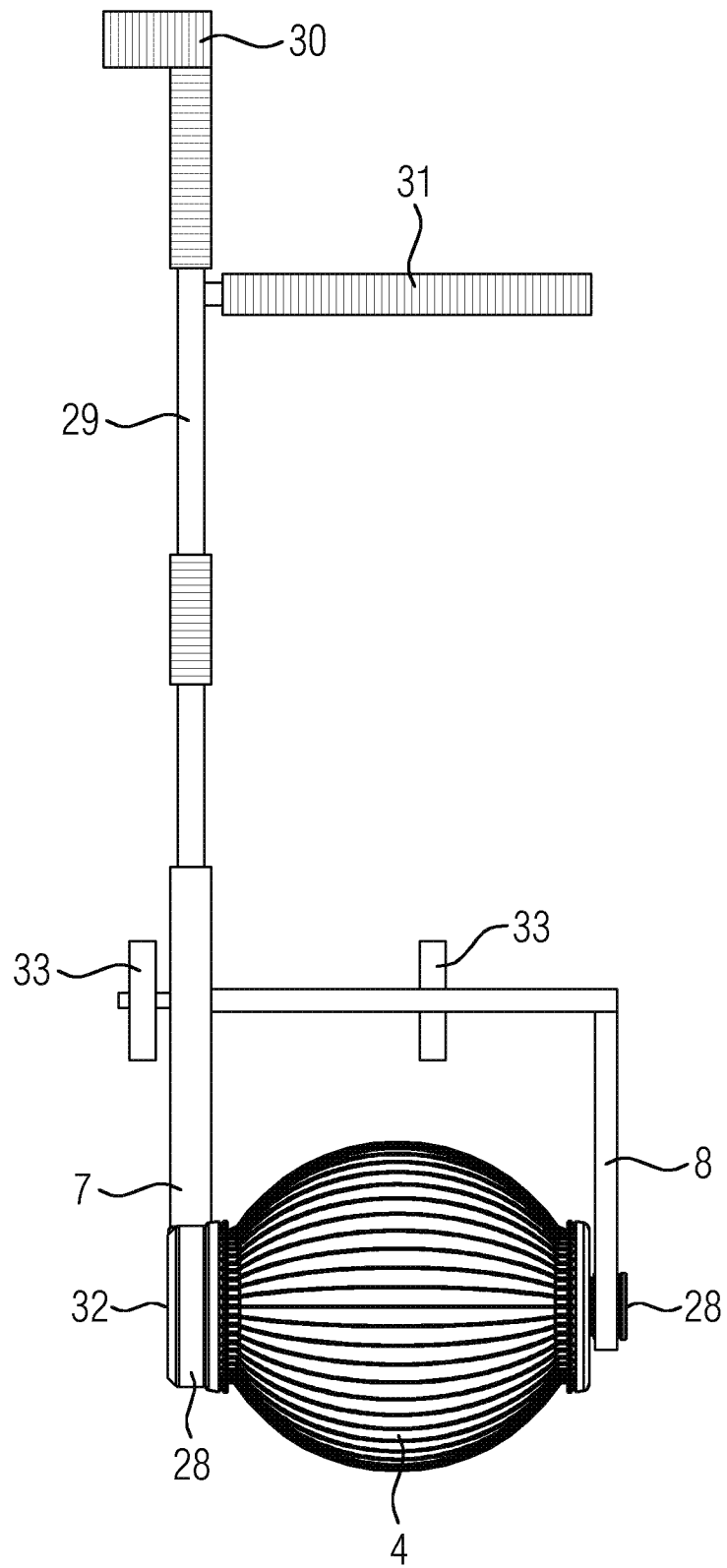
FIG. 18 shows top view of the fruit collector of the further embodiment.

FIG. 17 shows a further embodiment of a fruit collector in a side view, and FIG. 18 shows this fruit collector in a top view.

The fruit collector is implemented as a manual and hand-operated device that can be operated by a human operator.

The fruit collector comprises a collecting container 4 which is pivotably attached to free ends, i.e. bracket arms 7 and 8, of a forked, cantilevered retaining bracket 3.

As can be seen from this embodiment, the collecting container 4 may be attached to the bracket arms 7, 8 via slip rings 28, which may be considered as hub-stub-axle combinations or bearing sections implemented at terminal ends of the bracket arms 7, 8 of the retaining bracket 3.

The retaining bracket 3 of this further embodiment may be considered as a part of or as being attached to an operating handle 2 for manually operating the fruit collector 1. A handle bar 29 extends from, and may, for example, be detachably connected to one of the bracket arms, i.e. the left-hand bracket arm 7 in FIG. 18. The handle bar 29 extends in parallel to the bracket arm 7 and away from the bracket 3.

At a side averted from the bracket 3, the operating handle 2 may be provided with a half-shell 30 attached, for example by welding, at a terminal end of the handle bar 29. The half shell 30 may be adapted and intended to bear against the operators forearm or elbow during manually operating the fruit collector 1.

At a distance downwards from the half shell 39, the operating handle 2 in accordance with embodiments may comprise a cantilever arm 31 enabling a human operator to handle or control the operating handle 2 with both hands. For example, in the configuration shown in FIG. 17 and FIG. 18, the operating user may use the cantilever arm 31 as a grip to control the fruit collector 1 not only with the right arm, which is in engagement with the half shell 30, but also with the left arm or hand gripping the cantilever arm 31. The cantilever arm 31 may also be used as an aid for emptying the collecting container 4, by utilising it as a lever arm to rotate and tip over the collecting container 4 such that an axial discharge opening 32 is oriented downwards so that fruits contained within the collecting container 4 can roll or drop out by the action of gravity.

The operating handle 2 in embodiments such as shown in FIG. 17 and FIG. 18 may further comprise a pair of fixed rollers 33 respectively attached to a support arm projecting perpendicularly from the handle bar 29 and, relative to the ordinary operating configuration, oriented downwards such that the fruit collector 1 may be pushed or rolled over the ground by means of the fixed rollers 33. Thus, the fixed rollers 33 may be considered as a type of travel carriage for the fruit collector 1. In addition, the fixed rollers 33 and support arms may be used as support legs or support wheels enabling the fruit collector 1, in particular when emptied, to be left or parked free standing on the ground.

The collecting container 4 in accordance with the embodiment shown in FIG. 17 and FIG. 17 may comprise an envelope formed from a plurality of elastic and elastically bulged wire straps made from stainless steel. The wire straps may be attached at both axial ends to a stub or hub of the collecting container 4, wherein the curvature of the wire straps is such that the collecting container 4 has an overall bulged and convex shape.

At one axial end of the collecting container 4 of the embodiment according to FIG. 17 and FIG. 18, in the region of the stub or hub, and as shown in FIG. 18 at the left axial end of the collecting container 4, the discharge opening 32 is provided such that a discharging action in which objects can be discharged from the inside of the collection container 4 can be obtained in a direction in parallel to the pivot axis of the collecting container 4. Thus, it is not required to discharge collected fruits through the wire straps of the envelope of the collecting container 4, and therefore discharging fruits and objects collected in the collecting container 4 can be greatly simplified.

The wire straps of the envelope of the collecting container 4 may be attached at respective axial end sections, for example hubs or stub axles, of the collecting container 4 with a mutual distance in circumferential direction of about 25 mm. The configuration of the wire straps may be such that the collecting container 4 comprises a diameter of about 350 mm. Further, the collecting container 4 may be implemented such that the discharge opening has a diameter of about 200 mm.

Collecting fruits with the fruit collector 1 as shown and described in connection with FIG. 17 and FIG. 18 may imply moving or rolling the collecting container 4 over the fruits to be collected. Upon moving the collecting container 4 over a fruit to be collected and having a diameter that is larger than the gaps formed between adjacent wire straps, the fruit may cause adjacent wire straps to move and spread apart by elastic deformation, in circumferential direction, to thereby generate a gap sufficiently large for the fruit to pass by the wire straps and enter the collecting container 4.

By passing the wire straps, i.e. envelope, the wire straps under the action of elastic restoring forces move towards each other again to adopt the ordinary mutual configuration or alignment of the envelope as soon as the object has passed the envelope.

Thus, collecting fruits may be accomplished by passing the fruits through the wire strap envelope in a rolling motion of the collecting container, easing the collection of fruits, whilst emptying the collecting container can be accomplished by discharging them through the discharge opening in a comparatively fast and simple way.

LIST OF REFERENCE NUMERALS 1 fruit collector
2 handle
3 retaining bracket
4 collecting container
5 envelope
6 bracket body
7 first bracket arm
8 second bracket arm
9 hub
10 bearing mounting
11 coupling interface
12 stub axle section
13 central hole
14 spout
15 through hole
16 additional stub axle section
17 attachment flange
18 outer sliding surface
19 inner sliding surface
20 wire bar
21 hook type portion
22 groove
23 tip end
24 spacer lug
25 fruit
26 spout opening
27 friction reducing structural elements
28 slip ring
29 handle bar
30 half shell
31 cantilever arm
32 axial discharge opening
33 fixed roller
34 outer edge
35 recess
H horizontal direction
V vertical plane
a inclination angle
b working angle
P spout opening plane CP centre plane
CT centre point

The invention claimed is:

1. A retaining bracket for a fruit collector, the retaining bracket being arranged to pivotably retain a fruit collecting container, and comprising a hub which is arranged to pivotably retain a stub axle section of the collecting container projecting from an axial end of the collecting container,
wherein the hub comprises an inner, central hole configured and sized to enable fruits collected in the collecting container to pass through, and arranged to communicate via a container opening at the stub axle section with a container inner volume once the collecting container is coupled to the hub.

2. The retaining bracket according to claim 1, wherein the hub is implemented as an integral hub of the retaining bracket, and in a one-piece configuration with the retaining bracket.

3. The retaining bracket according to claim 1, wherein the hub comprises an integral spout communicating with the central hole of the hub.

4. The retaining bracket according to claim 1, comprising a spout configured to pass through fruits into and out of the collecting container, wherein the spout extends and opens in a direction parallel and/or inclined to a pivoting axis the hub.

5. The retaining bracket according to claim 4, wherein the spout and/or an outer edge of the spout is shaped as at least one of corrugated, recessed, and toothed, and/or dimensioned and/or adjustable so as to support picking-up of fruits and/or to impede dropping-out of fruits from the collecting container.

6. The retaining bracket according to claim 4, wherein the spout or at least a section thereof is bowl-shaped, paddle-shaped and/or shovel-shaped so as to enable active fruit collecting via the spout.

7. The retaining bracket according to claim 1, wherein the hub is implemented on a first arm of the retaining bracket, and a bearing or sliding mounting is implemented on a second arm of the retaining bracket, the bearing or sliding mounting to retain the collecting container to be pivotable around an axis defined by the bearing or sliding mounting and hub.

8. A collecting container configured to be coupled pivotably around a pivot axis with a retaining bracket wherein the collecting container comprises at an axial end thereof a stub axle section configured to be pivotably coupled with a hub of the retaining bracket, the stub axle section having a through-hole configured to communicate with an inner, central hole of the hub, and sized and dimensioned so as to enable, when coupled to the hub, a passage of objects collected through the central hole and through-hole into the collecting container, wherein the collecting container is operable to pick up the objects by rolling an envelope of the collecting container over the objects in a pivoting movement of the collecting container around the pivot axis such that the objects, by elastically deforming the envelope, can pass through the envelope and enter the collecting container.

9. The collecting container according to claim 8, wherein the stub axle section comprises a sliding or bearing surface adapted to cooperate with a counterpart bearing or sliding surface of the hub or bearing mounting, and wherein the sliding or bearing surface comprises friction reducing components or friction reducing structural elements to reduce friction between the bearing or sliding surfaces.

10. The collecting container according to claim 8, further comprising an additional stub axle section implemented at an axial end of the collecting container averted from the stub axle section that is intended to cooperate with the hub.

11. The collecting container according to claim 10, wherein an inner volume of the collecting container is defined by the envelope arranged to enable the objects passing into the inner volume upon rolling the collecting container and the envelope over the objects, wherein the stub axle section of the collecting container, and, the additional stub axle section, comprises a mounting portion for mounting the envelope to the stub axle section, wherein the mounting portion comprises a circumferential mounting groove or a plurality of circumferential mounting slots, configured to accommodate end sections of the envelope and oriented in axial direction with respect to the pivot axis of the collecting container.

12. The collecting container according to claim 11, wherein the envelope comprises a plurality of elongated and flexible bars, wherein an axial end of each of the bars is fixed in the mounting groove or in a mounting slot, and wherein the bars, and/or mounting groove, and/or mounting slots are configured such that the bars bend outwardly with respect to the inner volume of the collecting container and define a convex volume of the collecting container, wherein each bar comprises at an axial end a hook portion adapted to engage the mounting groove or mounting slot in a form-locking and/or snap-locking mechanical connection.

13. The collecting container according to claim 12, wherein the stub axle section comprises a plurality of spacer lugs, projecting in axial direction from the stub axle section with respect to the pivoting axis of the collecting container, and designed such that each pair of adjacent bars is separated in, near, or at the mounting groove or mounting slots by a respective spacer lug.

14. A fruit collector device comprising at least one fruit collecting tool comprising at least one pivotable fruit collecting container and a retaining bracket, wherein the at least one pivotable fruit collecting container is adapted to be pivotably associated with the retaining bracket, wherein the size of a through-hole of a stub axle section and central hole of the hub are such that they form, in an ordinary mounted configuration in which the collecting container is pivotably retained by the retaining bracket, a through-opening leading from the outside of the collecting container through the hub and stub axle section to an inside of the collecting container and enabling objects to be passed through into and out of the collecting container, wherein the at least one pivotable fruit collecting container is configured to be pivotable around a pivot axis and operable to pick up the objects by rolling an envelope of the at least one pivotable fruit collecting container over the objects in a pivoting movement of the at least one pivotable fruit collecting container around the pivot axis such that the objects, by elastically deforming the envelope, can pass through the envelope and enter the at least one pivotable fruit collecting container.

15. The fruit collector device according to claim 14, wherein the retaining bracket comprises or is associated with an axial spout projecting from the retaining bracket in axial direction of the pivot axis.

16. The fruit collector device according to claim 14, the fruit collector device comprising a support roll assembly comprising a pair of fixed rollers configured to support the collector device during operation and/or during idle phases.

* * * * *